US012586534B2

(12) United States Patent
Kim et al.

(10) Patent No.: US 12,586,534 B2
(45) Date of Patent: Mar. 24, 2026

(54) DRIVING CIRCUIT UNIT, DISPLAY DEVICE INCLUDING THE SAME, AND METHOD OF DRIVING THE SAME

(71) Applicant: Samsung Display Co., LTD., Yongin-si (KR)

(72) Inventors: Su Bin Kim, Yongin-si (KR); Se Byung Chae, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 182 days.

(21) Appl. No.: 18/532,642

(22) Filed: Dec. 7, 2023

(65) Prior Publication Data

US 2024/0347008 A1 Oct. 17, 2024

(30) Foreign Application Priority Data

Apr. 13, 2023 (KR) ........................ 10-2023-0048751

(51) Int. Cl.
*G09G 3/3266* (2016.01)
*G09G 3/3233* (2016.01)

(52) U.S. Cl.
CPC ......... *G09G 3/3266* (2013.01); *G09G 3/3233* (2013.01); *G09G 2300/0819* (2013.01); *G09G 2300/0852* (2013.01); *G09G 2310/08* (2013.01); *G09G 2320/0238* (2013.01); *G09G 2330/021* (2013.01); *G09G 2340/0435* (2013.01)

(58) Field of Classification Search
CPC ............... G09G 3/3266; G09G 3/3233; G09G 2300/0819; G09G 2300/0852; G09G 2310/08; G09G 2320/0238; G09G 2330/021; G09G 2340/0435
See application file for complete search history.

(56) References Cited

U.S. PATENT DOCUMENTS

| | | | | |
|---|---|---|---|---|
| 9,500,916 | B2 | 11/2016 | Fukai et al. | |
| 10,674,112 | B2 | 6/2020 | Moon et al. | |
| 10,879,898 | B2 | 12/2020 | Shin et al. | |
| 11,372,563 | B2 | 6/2022 | Lee et al. | |
| 11,532,269 | B2 | 12/2022 | Lee et al. | |
| 2015/0138254 | A1* | 5/2015 | Nakayama ............ | G06F 1/3265 345/690 |
| 2021/0312868 | A1* | 10/2021 | Kim ..................... | H10K 59/131 |

FOREIGN PATENT DOCUMENTS

| | | | |
|---|---|---|---|
| KR | 1020200033084 | A | 3/2020 |
| KR | 1020200087595 | A | 7/2020 |
| KR | 1020220048409 | A | 4/2022 |
| KR | 1020220131876 | A | 9/2022 |
| KR | 102499010 | B1 | 2/2023 |

* cited by examiner

*Primary Examiner* — Jonathan A Boyd
(74) *Attorney, Agent, or Firm* — CANTOR COLBURN LLP

(57) ABSTRACT

A driving circuit unit includes: a first driver configured to be driven during a display scan period included in an active period of one frame; a second driver configured to be driven during at least one self-scan period included in a blank period of the one frame; a first switch connected between a driving power line to which driving power is supplied and the first driver, configured to be turned on in the active period, and configured to be turned off in the blank period; and a first storage unit configured to receive and store driving data from the first driver before the first switch is turned off.

23 Claims, 19 Drawing Sheets

<DSP>

SWcs: SW1cs, SW2cs, SW3cs
flag: flag1, flag2

<DSP>

<SSP>

DRIVING CIRCUIT UNIT, DISPLAY DEVICE INCLUDING THE SAME, AND METHOD OF DRIVING THE SAME

This application claims priority to Korean Patent Application No. 10-2023-0048751, filed on Apr. 13, 2023, and all the benefits accruing therefrom under 35 U.S.C. § 119, the content of which in its entirety is herein incorporated by reference.

BACKGROUND

1. Field

The disclosure relates to a driving circuit unit, a display device including the same, and a method of driving the same.

2. Description of the Related Art

As information technology is developed, importance of a display device, which is a connection medium between a user and information, has been highlighted. In response to this, a use of a display device such as a liquid crystal display device and an organic light emitting display device is increasing.

The display device is desirable to have a high-speed driving function that provides an image switched at a high frame frequency to a user and a low-speed driving function that provides an image switched at a low frame frequency to the user. In addition, a method capable of minimizing power consumption when the display device is driven at low-speed driving is desirable.

SUMMARY

An aspect of the disclosure is to provide a driving circuit unit capable of minimizing power consumption when a display device is driven at a low frequency, a display device including the same, and a method of driving the same.

According to embodiments of the disclosure, a driving circuit unit includes: a first driver configured to be driven during a display scan period included in an active period of one frame; a second driver configured to be driven during at least one self-scan period included in a blank period of the one frame; a first switch connected between a driving power line to which driving power is supplied and the first driver, configured to be turned on in the active period, and configured to be turned off in the blank period; and a first storage unit configured to receive and store driving data from the first driver before the first switch is turned off.

According to an embodiment, the second driver may include a controller configured to receive a control signal including a data enable signal and a vertical synchronization signal and controls turn-on and turn-off of the first switch using at least one of the data enable signal and the vertical synchronization signal.

According to an embodiment, the driving circuit unit may further include a second switch connected between a clock supply line to which a clock signal is supplied and the first driver, and configured to be turned on in the active period and configured to be turned off in the blank period by the controller.

According to an embodiment, the driving circuit unit may further include a third switch connected between a control signal supply line to which the control signal is supplied and the first driver, configured to be turned on in the active period and configured to be turned off in the blank period by the controller.

According to an embodiment, the controller may turn on the first switch before the data enable signal of a pulse form is supplied, and turn off the first switch after the data enable signal of the pulse form is supplied.

According to an embodiment, the first driver may include a second storage unit configured to be store the driving data.

According to an embodiment, the second storage unit may receive and store the driving data from the first storage unit in response to a first flag signal supplied from the controller, and the first storage unit may receive and store the driving data from the second storage unit in response to a second flag signal supplied from the controller.

According to an embodiment, the controller may sequentially supply the first flag signal and the second flag signal to overlap a period in which the first switch is turned on and the driving power is supplied to the first driver.

According to an embodiment, the controller may supply the first flag signal before the data enable signal of a pulse form is supplied, and supply the second flag signal after the data enable signal of the pulse form is supplied.

According to an embodiment, the first storage unit may be a static random access memory (SRAM).

According to an embodiment, the driving circuit unit may further include a fourth switch connected between the driving power line and the first storage unit and configured to be turned on to overlap a period in which the first flag signal is supplied and a period in which the second flag signal is supplied.

According to an embodiment, the second driver may be driven during the display scan period.

According to an embodiment, the first storage unit may be included in the second driver.

According to an embodiment of the disclosure, a driving circuit unit driven in a first mode and a second mode includes: a first driver configured to receive a driving voltage when driven in the first mode and does not receive the driving voltage when driven in the second mode; and a storage unit configured to receive and store driving data of the first driver when changed from the first mode to the second mode. The first driver receives the driving data from the storage unit when changed from the second mode to the first mode.

According to an embodiment, one frame period may include a period of the first mode and a period of the second mode.

According to an embodiment, the period of the second mode period included in the one frame period may increase as a driving frequency of the driving circuit unit decreases.

According to an embodiment of the disclosure, a display device includes: pixels connected to display scan lines, self-scan lines, emission control lines, and data lines; at least one display scan driver configured to supply a scan signal to the display scan lines during an active period of one frame; at least one self-scan driver configured to supply the scan signal to the self-scan lines during the active period and a blank period of the one frame; a data driver configured to supply a data signal to the data lines during the active period; an emission driver configured to supply an emission control signal to the emission control lines during the active period and the blank period; and a driving circuit unit configured to control the display scan driver, the self-scan driver, the data driver, and the emission driver. The driving circuit unit includes: a first driver configured to be driven during a display scan period included in the active period; a second driver configured to be driven during at least one self-scan period included in the blank period; a first switch connected between a driving power line to which driving power is supplied and the first driver, configured to be turned on in the active period and configured to be turned off in the blank period in response to control of a controller included in the second driver; and a first storage unit configured to receive and store driving data from the first driver before the first switch is turned off.

According to an embodiment, the display device may further include a second switch connected between a clock supply line to which a clock signal is supplied and the first driver, configured to be turned on in the active period, and configured to be turned off in the blank period in response to the control of the controller.

According to an embodiment, the display device may further include a third switch connected between a control signal supply line to which a control signal is supplied and the first driver, configured to be turned on in the active period and configured to be turned off in the blank period in response to the control of the controller.

According to an embodiment, the first driver may include a second storage unit configured to be store the driving data, the first switch is set to a turn-on state and before a data enable signal of a pulse form is supplied, driving data of the first storage unit is supplied to the second storage unit, and after the data enable signal of the pulse form is supplied and while the first switch is set to the turn-on state, driving data of the second storage unit is supplied to the first storage unit.

According to an embodiment, the display device may further include a fourth switch connected between the driving power line and the first storage unit, configured to be turned on in the active period, and configured to be turned off in the blank period in response to the control of the controller.

According to an embodiment, the first storage unit may be included in the second driver.

According to an embodiment, the display device may further include a fifth switch connected between the driving power line and each of the display scan driver and data driver, configured to be turned on in the active period, and configured to be turned off in the blank period in response to the control of the controller.

According to an embodiment of the disclosure, a method of driving a display device includes: generating output data and a display driving control signal using a first driver during an active period of one frame; generating a self-driving control signal using a second driver during a blank period of the one frame; storing driving data for driving the first driver in a first storage unit after the active period; and cutting off driving power supplied to the first driver during the blank period.

Aspects of the disclosure are not limited to the aspects described above, and other technical aspects which are not described will be clearly understood by those skilled in the art from the following description.

In accordance with the driving circuit unit, the display device including the same, and the method of driving the same according to the embodiments of the disclosure, when one frame includes the display scan period and the self-scan period, power supply to configurations which are not used may be cut off during the self-scan period, and power consumption may be effectively minimized.

However, an effect of the disclosure is not limited to the above-described effect, and may be variously expanded without departing from the spirit and scope of the disclosure.

BRIEF DESCRIPTION OF THE DRAWINGS

The above and other features of the disclosure will become more apparent by describing in further detail embodiments thereof with reference to the accompanying drawings, in which.

DETAILED DESCRIPTION

Figure 1:
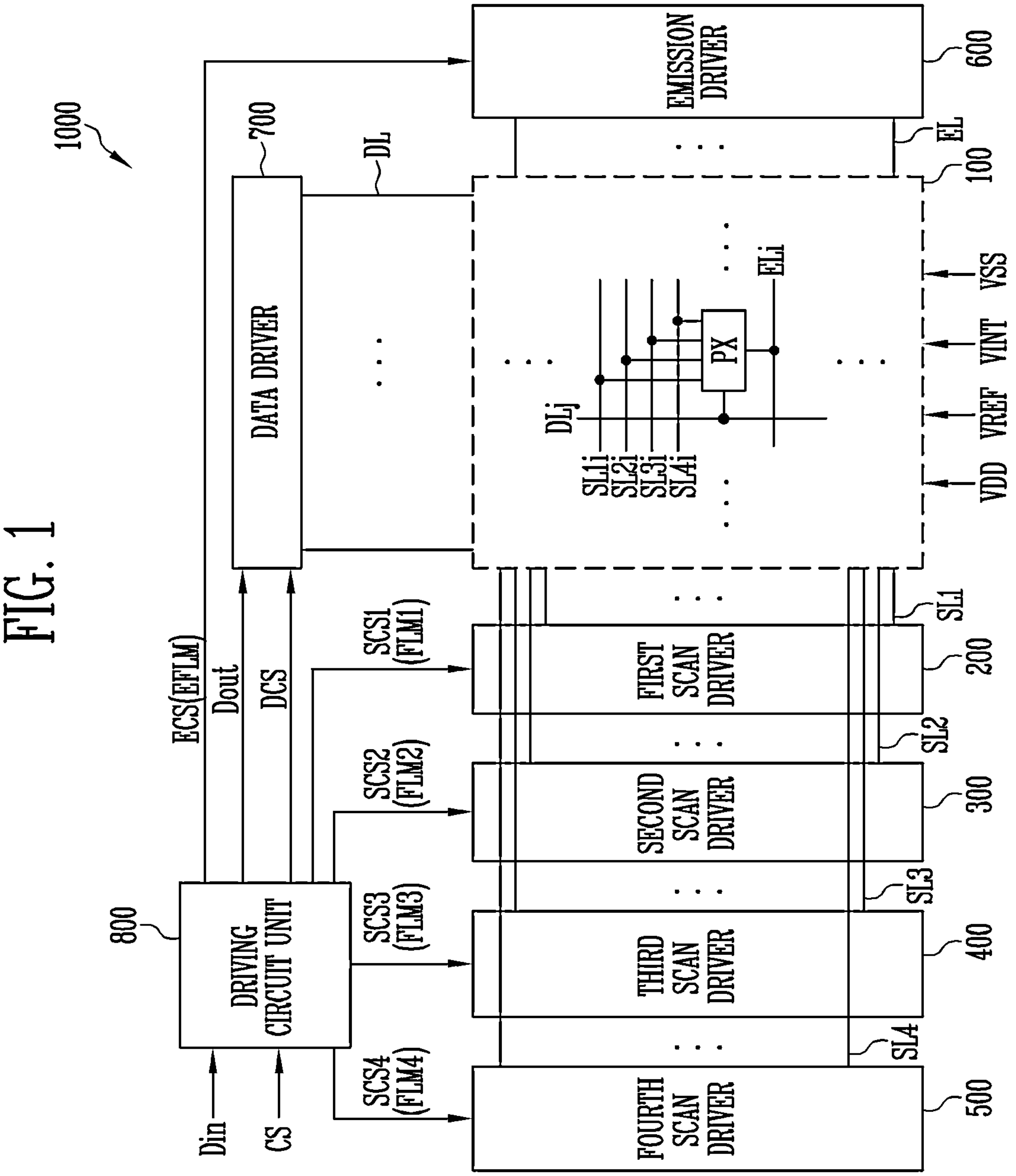
FIG. 1 is a diagram illustrating a display device according to an embodiment of the disclosure.

Hereinafter, various embodiments of the disclosure will be described in detail with reference to the accompanying drawings so that those skilled in the art may easily carry out the disclosure. The disclosure may be implemented in various different forms and is not limited to the embodiments described herein.

In order to clearly describe the disclosure, parts that are not related to the description are omitted, and the same or similar elements are denoted by the same reference numerals throughout the specification. Therefore, the above-described reference numerals may be used in other drawings.

In addition, sizes and thicknesses of each component shown in the drawings are arbitrarily shown for convenience of description, and thus the disclosure is not necessarily limited to those shown in the drawings. In the drawings, thicknesses may be exaggerated to clearly express various layers and areas.

In addition, an expression "is the same" in the description may mean "is substantially the same". That is, the expression "is the same" may be the same enough for those of ordinary skill to understand that it is the same. Other expressions may also be expressions in which "substantially" is omitted.

Some embodiments are described in the accompanying drawings in relation to functional block, unit, and/or module. Those skilled in the art will understand that such block, unit, and/or module are/is physically implemented by a logic circuit, an individual component, a microprocessor, a hard wire circuit, a memory element, a line connection, and other electronic circuits. This may be formed using a semiconductor-based manufacturing technique or other manufacturing techniques. The block, unit, and/or module implemented by a microprocessor or other similar hardware may be programmed and controlled using software to perform various functions discussed herein, optionally may be driven by firmware and/or software. In addition, each block, unit, and/or module may be implemented by dedicated hardware, or a combination of dedicated hardware that performs some functions and a processor (for example, one or more programmed microprocessors and related circuits) that performs a function different from those of the dedicated hardware. In addition, in some embodiments, the block, unit, and/or module may be physically separated into two or more interact individual blocks, units, and/or modules without departing from the scope of the invention. In addition, in some embodiments, the block, unit and/or module may be physically combined into more complex blocks, units, and/or modules without departing from the scope of the invention.

A term "connection" between two configurations may mean that both of an electrical connection and a physical connection are used inclusively, but is not limited thereto. For example, "connection" used based on a circuit diagram may mean an electrical connection, and "connection" used based on a cross-sectional view and a plan view may mean a physical connection.

Although the terms "first", "second", and the like are used to describe various components, these components are not limited by these terms. These terms are used only to distinguish one component from another component. Therefore, a first component described below may be a second component within the technical spirit of the disclosure. The singular expression includes the plural expression unless the context clearly dictates otherwise.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Meanwhile, the disclosure is not limited to the embodiments disclosed below, and may be modified in various forms and may be implemented. In addition, each of the embodiments disclosed below may be implemented alone or in combination with at least one of other embodiments.

FIG. 1 is a diagram illustrating a display device according to an embodiment of the disclosure.

Referring to FIG. 1, the display device 1000 according to an embodiment of the disclosure may include a pixel unit 100, scan drivers 200, 300, 400, and 500, an emission driver 600, a data driver 700, and a driving circuit unit 800 (or a timing controller).

In an embodiment, the display device 1000 may further include a power supply for supplying a voltage of first power VDD, a voltage of second power VSS, a voltage of initialization power VINT, and a voltage of reference power VREF to the pixel unit 100. The power supply may supply a gate-on voltage and a gate-off voltage of a scan signal and/or an emission control signal to the scan drivers 200, 300, 400, and 500 and/or the emission driver 600. However, this is exemplary, and at least one of the first power VDD, the second power VSS, the initialization power VINT, and the reference power VREF may be supplied from the data driver 700 or the driving circuit unit 800.

According an embodiment, the first power VDD and the second power VSS may be used to drive a light emitting element. To this end, a voltage of the first power VDD may be set to a level higher than the level of a voltage of the second power VSS. For example, the first power VDD may be a positive voltage and the second power VSS may be a negative voltage.

The initialization power VINT may be power for initializing a pixel PX. In an embodiment, for example, a driving transistor included in the pixel PX and an anode electrode of the light emitting element may be initialized by the voltage of the initialization power VINT. The initialization power VINT may be set to a voltage lower than a voltage of a data signal.

The reference power VREF may be power for initializing the pixel PX. For example, a capacitor and/or a transistor included in the pixel PX may be initialized by the voltage of the reference power VREF. The reference power VREF may be a positive voltage. In an embodiment, for example, the reference power VREF may have the same voltage level as the first power VDD, but the disclosure is not limited thereto.

The display device 1000 may display an image at various image refresh rates (driving frequencies, or screen reproduction rates) according to a driving condition. The image refresh rate means a frequency at which the data signal is written to the driving transistor of the pixel PX. For example, the image refresh rate may be referred to as a screen scan rate or a screen reproduction frequency, and may indicate a frequency at which a display screen is reproduced during one second.

In an embodiment, an output frequency of the data driver 700 for one horizontal line (or pixel row) and/or an output frequency of the first scan driver 200 outputting a first scan signal (or write scan signal) may be determined in response to the image refresh rate. In an embodiment, for example, an image refresh rate for driving a moving image may be a frequency of about 60 Hz or more (for example, 120 Hz, 240 Hz, or the like).

In an embodiment, the display device 1000 may adjust the output frequency of the scan drivers 200, 300, 400, and 500 for one horizontal line (or pixel row), and the output frequency of the data driver 700 corresponding to the output frequency of the scan drivers 200, 300, 400, and 500 according to the driving condition. In an embodiment, for example, the display device 1000 may display an image in response to various image refresh rates of 1 Hz to 240 Hz. However, this is exemplary, and the display device 1000 may display an image also at an image refresh rate of 240 Hz or higher (for example, 480 Hz).

The pixel unit 100 includes the pixels PX respectively connected to data lines DL, scan lines SL1, SL2, SL3, and SL4, and emission control lines EL. The pixels PX may receive the first power VDD, the second power VSS, the initialization power VINT, and the reference power VREF from an outside. In an embodiment, a pixel PX disposed in an i-th (i is a natural number) row and a j-th (j is a natural number) column may be connected (or coupled) to scan lines SL1*i*, SL2*i*, SL3*i*, and SL4*i* corresponding to an i-th horizontal line, an emission control line ELi corresponding to the i-th horizontal line, and a data line DLj corresponding to a j-th vertical line (or pixel column). In an embodiment of the disclosure, the signal lines SL1, SL2, SL3, SL4, EL, and DL connected to the pixel PX may be set variously in response to a circuit structure of the pixel PX.

The scan drivers 200, 300, 400, and 500 may be divided into configurations and operations of a first scan driver 200, a second scan driver 300, a third scan driver 400, and a fourth scan driver 500. However, the division of the scan driver is for convenience of description, and at least some of the scan drivers may be integrated into one driving circuit, module, or the like, according to design.

The first scan driver 200 may supply a first scan signal to first scan lines SL1 in response to a first driving control signal SCS1 supplied from the driving circuit unit 800. For example, the first scan driver 200 may sequentially supply the first scan signal to the first scan lines SL1. When the first scan signal is sequentially supplied, the pixels PX may be selected in a horizontal line unit (that is, a pixel row unit), and the data signal may be supplied to the pixels PX. That is, the first scan signal may be a signal used for writing data. The first scan signal may be set to a gate-on voltage (for example, a low level). A transistor included in the pixel PX and receiving the first scan signal is set to a turn-on state when the first scan signal is supplied.

In an embodiment, the first scan driver 200 may supply the first scan signal at a frequency equal to the refresh rate of the display device 1000 in response to any one of the first scan lines SL1 (for example, an i-th scan line SL1*i*).

The first scan driver 200 may supply the first scan signal to the first scan lines SL1 during a display scan period of one frame. In an embodiment, the first scan driver 200 may sequentially supply the first scan signal to the first scan lines SL1 while shifting a first scan start signal FLM1 included in the first driving control signal SCS1 in response to a clock signal. In an embodiment, for example, the first scan driver 200 may supply at least one first scan signal to each of the first scan lines SL1 during the display scan period.

The second scan driver 300 may supply a second scan signal to second scan lines SL2 in response to a second driving control signal SCS2 supplied from the driving circuit unit 800. In an embodiment, the second scan driver 300 may sequentially supply the second scan signal to the second scan lines SL2 while shifting a second scan start signal FLM2 included in the second driving control signal SCS2 in response to a clock signal. The second scan signal may be supplied to initialize the pixels PX and/or to compensate for a threshold voltage (Vth) of the driving transistor. The second scan signal may be set to a gate-on voltage (for example, a low level). A transistor included in the pixel PX and receiving the second scan signal is set to a turn-on state when the second scan signal is supplied.

The second scan driver 300 may supply the second scan signal to the second scan lines SL2 during the display scan period of one frame. In an embodiment, for example, the second scan driver 300 may supply at least one second scan signal to each of the second scan lines SL2 during the display scan period.

The third scan driver 400 may supply a third scan signal to third scan lines SL3 in response to a third driving control signal SCS3 supplied from the driving circuit unit 800. In an embodiment, the third scan driver 400 may sequentially supply the third scan signal to the third scan lines SL3 while shifting a third scan start signal FLM3 included in the third driving control signal SCS3 in response to a clock signal. The third scan signal may be supplied to initialize the driving transistor included in the pixels PX. The third scan signal may be set to a gate-on voltage (for example, a low level). A transistor included in the pixel PX and receiving the third scan signal is set to a turn-on state when the third scan signal is supplied.

The third scan driver 400 may supply the third scan signal to the third scan lines SL3 during the display scan period of one frame. In an embodiment, for example, the third scan driver 400 may supply at least one third scan signal to each of the third scan lines SL3 during the display scan period.

The fourth scan driver 500 (or an initial scan driver) may supply a fourth scan signal to fourth scan lines SL4 (or initial scan lines) in response to a fourth driving control signal SCS4 supplied from the driving circuit unit 800. In an embodiment, the fourth scan driver 500 may sequentially supply the fourth scan signal to the fourth scan lines SL4 while shifting a fourth scan start signal FLM4 included in the fourth driving control signal SCS4 in response to a clock signal. The fourth scan signal may be supplied to initialize the light emitting element included in the pixels PX. The fourth scan signal may be set to a gate-on voltage (for example, a low level). A transistor included in the pixel PX and receiving the fourth scan signal is set to a turn-on state when the fourth scan signal is supplied.

In an embodiment, the fourth scan driver 500 may supply the fourth scan signal at a constant frequency regardless of the image refresh rate frequency of the display device 1000 in response to one scan line (for example, SL4*i*) among the fourth scan lines SL4. In an embodiment, for example, the fourth scan driver 500 may perform scanning at least once according to the image refresh rate during a self-scan period while performing scanning once (supplying at least one fourth scan signal) during the display scan period. When the image refresh rate is decreased, the number of repetitions of an operation of the fourth scan driver 500 supplying the fourth scan signal to each of the fourth scan lines SL4 within one frame period may be increased.

The emission driver 600 may supply an emission control signal to the emission control lines EL in response to a fifth driving control signal ECS supplied from the driving circuit unit 800. In an embodiment, the emission driver 600 may sequentially supply the emission control signal to the emission control lines EL while shifting an emission start signal EFLM included in the fifth driving control signal ECS in response to a clock signal.

When the emission control signal is supplied, a transistor included in each of the pixels PX and receiving the emission control signal may be turned off, and thus electrical connection between the driving transistor included and the light emitting element may be cut off. To this end, the emission control signal may be set to a gate-off voltage (for example, a high level) so that the transistor included in the pixels PX may be turned off. The transistor included in the pixel PX and receiving the emission control signal may be turned off when the emission control signal is supplied, and may be set to a turn-on state when the emission control signal is not supplied. Here, supplying the emission control signal may mean that a gate-off voltage is supplied to the emission control lines EL, and not supplying the emission control signal may mean that a gate-on voltage is supplied to the emission control lines EL. The emission control signal may be used to control an emission time of the pixels PX. To this end, the emission control signal may be set to longer than a length of the scan signal.

In an embodiment, the emission driver 600 may supply the emission control signal at a constant frequency regardless of the image refresh rate frequency, similarly to the fourth scan driver 500. In an embodiment, for example, the emission driver 600 may perform scanning once during the display scan period (supply at least one emission control signal), and perform scanning at least once during the self-scan period according to the image refresh rate. Within one frame period, the emission control signal supplied to the emission control lines EL may be repeatedly supplied at a predetermined period. Accordingly, when the image refresh rate is decreased, the number of repetitions of an operation of the emission driver 600 supplying the emission control signal to each of the emission control lines EL may be increased within one frame period.

The data driver 700 may receive a sixth driving control signal DCS and output data Dout from the driving circuit unit 800. The data driver 700 may supply the data signal to the data lines DL in response to the sixth driving control signal DCS. In an embodiment, for example, the data driver 700 may generate an analog data signal using the digital output data Dout and supply the generated data signal to the data lines DL in synchronization with the first scan signal.

The driving circuit unit 800 may generate the first driving control signal SCS1, the second driving control signal SCS2, the third driving control signal SCS3, the fourth driving control signal SCS4, the fifth driving control signal ECS, and the sixth driving control signal DCS in response to a control signal supplied from the outside. In addition, the driving circuit unit 800 may correct (and/or rearrange) input data Din supplied from the outside to generate the output data Dout and supply the output data Dout to the data driver 700.

The first driving control signal SCS1 may include the first scan start signal FLM1 and the clock signals. The first scan start signal FLM1 may control a first timing of the first scan signal output from the first scan driver 200. The clock signals may be used to shift the first scan start signal FLM1.

The second driving control signal SCS2 may include the second scan start signal FLM2 and the clock signals. The second scan start signal FLM2 may control a first timing of the second scan signal output from the second scan driver 300. The clock signals may be used to shift the second scan start signal FLM2.

The third driving control signal SCS3 may include the third scan start signal FLM3 and the clock signals. The third scan start signal FLM3 may control a first timing of the third scan signal output from the third scan driver 400. The clock signals may be used to shift the third scan start signal FLM3.

The fourth driving control signal SCS4 may include the fourth scan signal FLM4 pulse and the clock signals. The fourth scan start signal FLM4 may control a first timing of the fourth scan signal output from the fourth scan driver 500. The clock signals may be used to shift the fourth scan start signal FLM4.

The fifth driving control signal ECS may include the emission start signal EFLM and the clock signals. The emission start signal EFLM may control a first timing of the emission control signal output from the emission driver 600. The clock signals may be used to shift the emission start signal EFLM.

The sixth driving control signal DCS may include a source start signal and the clock signals. The source start signal may control a sampling start time point of data. The clock signals may be used to control a sampling operation.

The first driving control signal SCS1, the second driving control signal SCS2, the third driving control signal SCS3, and the sixth driving control signal DCS used for driving of the display scan period may be referred to as "display driving control signals". In addition, the fourth driving control signal SCS4 and the fifth driving control signal ECS used for driving of the display scan period and the self-scan period may be referred to as "self-driving control signals".

Figure 2:
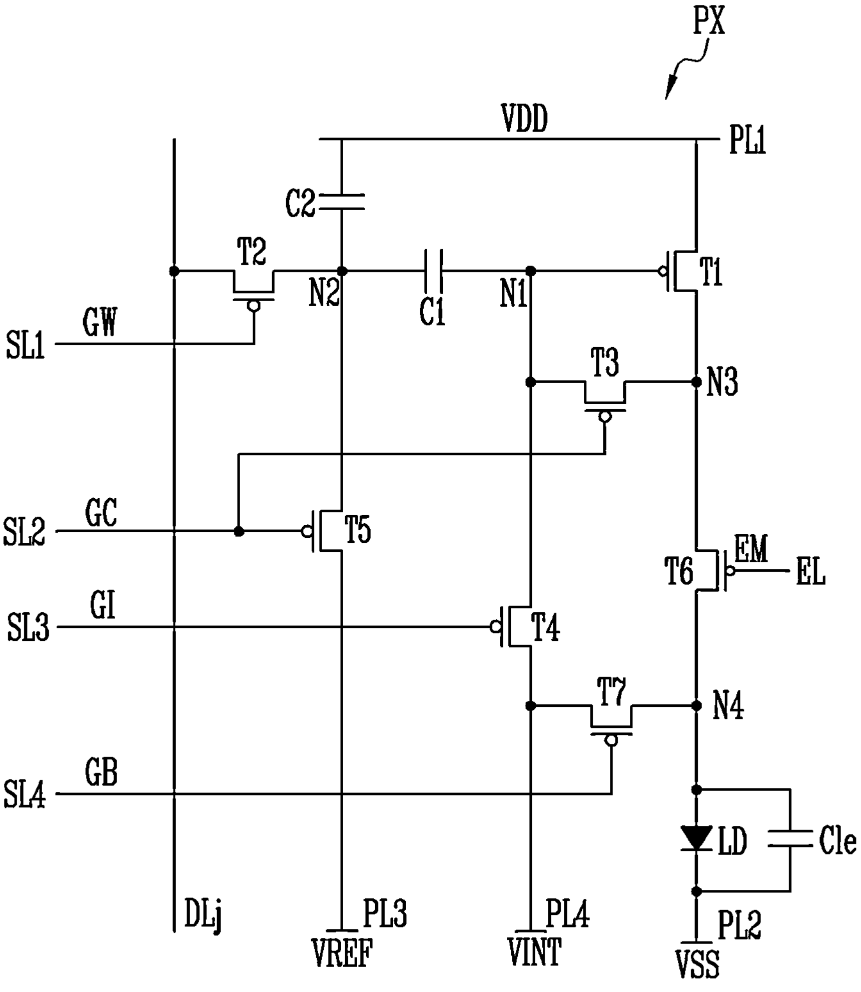
FIG. 2 is a circuit diagram illustrating an embodiment of a pixel included in the display device of FIG. 1.

FIG. 2 is a circuit diagram illustrating an embodiment of the pixel included in the display device of FIG. 1. In FIG. 2, a pixel PX positioned on an i-th horizontal line and a j-th vertical line is exemplarily shown.

Referring to FIG. 2, the pixel PX according to an embodiment of the disclosure may include a light emitting element LD and a pixel circuit that controls a current amount flowing through the light emitting element LD.

The light emitting element LD may be connected between a first power line PL1 to which the first power VDD is supplied and a second power line PL2 to which the second power VSS is supplied. For example, a first electrode (for example, an anode electrode) of the light emitting element LD may be connected to the first power line PL1 via a fourth node N4 and the pixel circuit, and a second electrode (for example, a cathode electrode) of the light emitting element LD may be connected to the second power line PL2. The light emitting element LD may emit light with a luminance corresponding to a driving current supplied from the pixel circuit.

The voltage of the first power VDD and the voltage of the second power VSS may have a predetermined potential difference so that the light emitting element LD may emit light. In an embodiment, for example, the first power VDD may be high-potential power having a high voltage, and the second power VSS may be lower-potential power having a voltage lower than the voltage of the first power VDD.

The light emitting element LD may be selected as an organic light emitting diode. In addition, the light emitting element LD may be selected as an inorganic light emitting diode such as a micro light emitting diode ("LED") or a quantum dot light emitting diode. In addition, the light emitting element LD may be an element configured of a combination of an organic material and an inorganic material. In FIG. 2, the pixel PX includes a single light emitting element LD, but in another embodiment, the pixel PX may include a plurality of light emitting elements, and the plurality of light emitting elements may be connected to each other in series, in parallel, or in series and parallel.

The pixel circuit may include at least one transistor and at least one capacitor. In an embodiment, for example, the pixel circuit includes a first transistor T1 (or a driving transistor), a second transistor T2, a third transistor T3, a fourth transistor T4, a fifth transistor T5, a sixth transistor T6, a seventh transistor T7, a first capacitor C1, and a second capacitor C2.

The first to seventh transistors T1 to T7 are shown as P-type transistors, but the disclosure is not limited thereto. For another example, at least one of the first to seventh transistors T1 to T7 may be formed as an N-type transistor.

A first electrode of the first transistor T1 is connected to the first power line PL1, and a second electrode is connected to a third node N3. In addition, a gate electrode of the first transistor T1 is connected to a first node N1. The first transistor T1 may control a current amount flowing from the first power line PL1 (that is, the first power VDD) to the second power line PL2 (that is, the second power VSS) via the light emitting element LD in response to a voltage of the first node N1. The first transistor T1 may be referred to as a driving transistor.

A first electrode of the second transistor T2 is connected to the data line DLj, and a second electrode is connected to a second node N2. In addition, a gate electrode of the second transistor T2 is connected to the first scan line SL1. The second transistor T2 is turned on when a first scan signal GW is supplied to the first scan line SL1 to electrically connect the data line DLj and the second node N2.

A first electrode of the third transistor T3 is connected to the third node N3, and a second electrode is connected to the first node N1. In addition, a gate electrode of the third transistor T3 is connected to the second scan line SL2. The third transistor T3 is turned on when a second scan signal GC is supplied to the second scan line SL2 to electrically connect the first node N1 and the third node N3. In this case, the first transistor T1 is connected in a diode form.

A first electrode of the fourth transistor T4 is connected to the first node N1, and a second electrode is connected to a fourth power line PL4 to which the initialization power VINT is supplied. In addition, a gate electrode of the fourth transistor T4 is connected to the third scan line SL3. The fourth transistor T4 is turned on when a third scan signal GI is supplied to the third scan line SL3 to supply the voltage of the initialization power VINT to the first node N1.

A first electrode of the fifth transistor T5 is connected to the second node N2, and a second electrode is connected to a third power line PL3. In addition, a gate electrode of the fifth transistor T5 is connected to the second scan line SL2. The fifth transistor T5 is turned on when the second scan signal GC is supplied to the second scan line SL2 to supply the voltage of the reference voltage VREF to the second node N2. Here, the reference power VREF may be set to the same voltage as the first power VDD or a predetermined DC voltage.

A first electrode of the sixth transistor T6 is connected to the third node N3, and a second electrode is connected to the fourth node N4 (that is, the anode electrode of the light emitting element LD). In addition, a gate electrode of the sixth transistor T6 is connected to the emission control line EL. The sixth transistor T6 is turned off when the emission control signal EM is supplied to the emission control line EL, and turned on in other cases. When the sixth transistor T6 is turned off, the first transistor T1 and the light emitting element LD are electrically cut off, and thus the light emitting element LD may be set to a non-emission state.

A first electrode of the seventh transistor T7 is connected to the fourth node N4, and a second electrode is connected to a fourth power line PL4. In addition, a gate electrode of the seventh transistor T7 is connected to the fourth scan line SL4. The seventh transistor T7 is turned on when a fourth scan signal GB is supplied to the fourth scan line SL4 to supply the voltage of the initialization power VINT to the anode electrode of the light emitting element LD. When the voltage of the initialization power VINT is supplied to the anode electrode of the light emitting element LD, a voltage of an organic capacitor Cle formed in the light emitting element LD may be discharged. When the voltage charged in the organic capacitor Cle is discharged, black expression capability may be improved.

The first capacitor C1 is connected between the first node N1 and the second node N2. The first capacitor C1 may store a voltage between the first node N1 and the second node N2.

The second capacitor C2 is connected between the first power line PL1 and the second node N2. The second capacitor C2 May store a voltage of the second node N2 and may stabilize the voltage of the second node N2.

Figure 3:
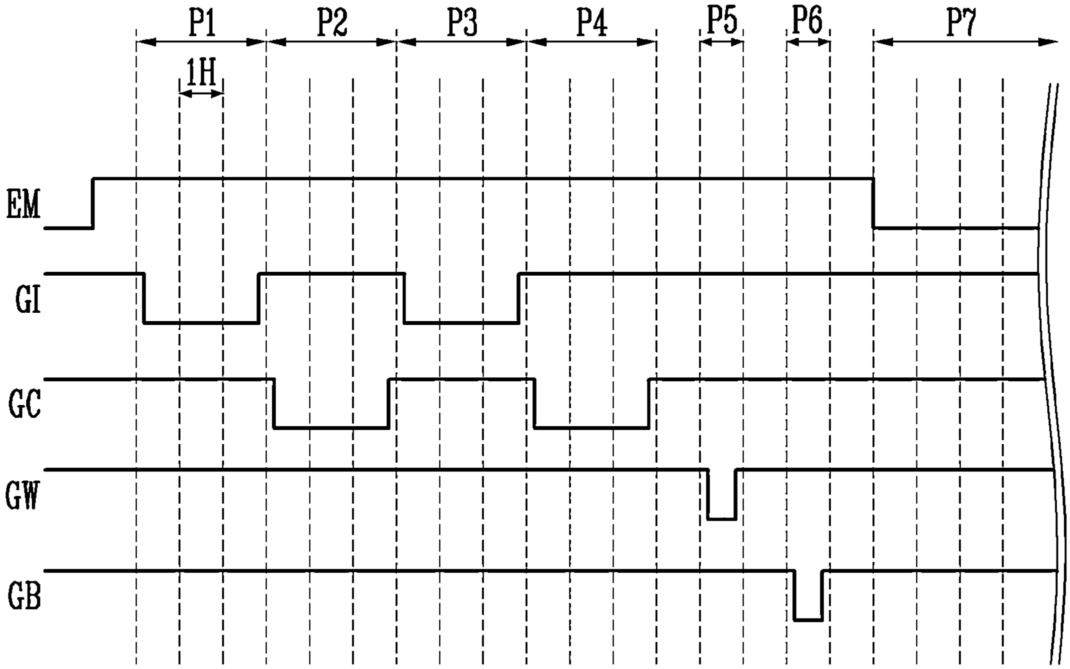
FIG. 3 is a waveform diagram illustrating a method of driving the pixel of FIG. 2 during a display scan period.

FIG. 3 is a waveform diagram illustrating a method of driving the pixel of FIG. 2 during the display scan period.

Referring to FIG. 3, the display scan period DSP may include a first period P1 to a fourth period P4. The first period P1 to the fourth period P4 may be a threshold voltage compensation period of the first transistor T1.

The display scan period DSP may include a fifth period P5 and a sixth period P6. The fifth period P5 may be a data writing period, and the sixth period P6 may be an initialization period of the light emitting element LD.

The display scan period DSP may include a seventh period P7. The seventh period P7 may be an emission period.

An interval between dotted lines in FIG. 3 may be set to one horizontal period (1H). One horizontal period (1H) may refer to a time interval of sequentially supplied scan signals or may be a time allocated to apply a data signal to one horizontal line. In an embodiment, for example, when the display device 1000 reproduces an image at a frequency of 240 Hz, one horizontal period (1H) may be approximately 1.84 microseconds (μs) or less.

The first period P1 to the fourth period P4 are shown as having a length of three horizontal periods (3H), but may have a value greater than or less than three horizontal periods (3H) according to a driving method. In addition, a length of at least one of the first period P1 to the fourth period P4 may be different from lengths of other periods.

The emission control signal EM is supplied to the emission control line EL during the first period P1 to the sixth period P6. When the emission control signal EM is supplied to the emission control line EL, the sixth transistor T6 is turned off. When the sixth transistor T6 is turned off, electrical connection between the first transistor T1 and the light emitting element LD is cut off, and thus the light emitting element LD is set to the non-emission state.

In the first period P1, the third scan signal GI is supplied to the third scan line SL3. When the third scan signal GI is supplied to the third scan line SL3, the fourth transistor T4 is turned on. When the fourth transistor T4 is turned on, the voltage of the initialization power VINT is supplied to the first node N1, and a voltage of a data signal of a previous frame may be decreased.

In the second period P2, the second scan signal GC is supplied to the second scan line SL2. When the second scan signal GC is supplied to the second scan line SL2, the third transistor T3 and the fifth transistor T5 are turned on.

When the third transistor T3 is turned on, the first transistor T1 is connected in a diode form. Then, a voltage obtained by subtracting an absolute value threshold voltage of the first transistor T1 from the first power VDD may be applied to the first node N1.

When the fifth transistor T5 is turned on, the voltage of the reference power VREF is supplied to the second node N2. Then, the voltage of the second node N2 is changed from a voltage of the previous frame to approximately the voltage of the reference power VREF.

During the second period P2, a voltage corresponding to a difference between the first node N1 and the second node N2 may be stored in the first capacitor C1. Here, since the first power VDD and the reference power VREF are set to a fixed voltage, the voltage stored in the first capacitor C1 may be determined by a threshold voltage of the first transistor T1.

In the third period P3, the third scan signal GI is supplied to the third scan line SL3. When the third scan signal GI is supplied to the third scan line SL3, the fourth transistor T4 is turned on. When the fourth transistor T4 is turned on, the voltage of the initialization power VINT is supplied to the first node N1

In the fourth period P4, the second scan signal GC is supplied to the second scan line SL2. When the second scan signal GC is supplied to the second scan line SL2, the third transistor T3 and the fifth transistor T5 are turned on.

When the third transistor T3 is turned on, the first transistor T1 is connected in a diode form. Then, the voltage obtained by subtracting the absolute value threshold voltage of the first transistor T1 from the first power VDD may be applied to the first node N1.

When the fifth transistor T5 is turned on, the voltage of the reference power VREF is supplied to the second node N2. Then, the voltage of the second node N2 is changed to approximately the voltage of the reference power VREF. During the fourth period P4, the voltage corresponding to the threshold voltage of the first transistor T1 may be stored in the first capacitor C1.

In an embodiment of the disclosure, the threshold voltage of the first transistor T1 may be more accurately compensated through the first period P1 to the fourth period P4.

In FIG. 3, the first period P1 to the fourth period P4 are included in order to compensate for the threshold voltage, but the disclosure is not limited thereto. For another example, a plurality of additional periods may be further included in addition to the first period P1 to the fourth period P4 to compensate for the threshold voltage.

In the fifth period P5, the first scan signal GW is supplied to the first scan line SL1. When the first scan signal GW is supplied to the first scan line SL1, the second transistor T2 is turned on. When the second transistor T2 is turned on, the data signal from the data line DLj is supplied to the second node N2. When the data signal is supplied to the second node N2, the voltage of the second node N2 is changed from the reference power VREF to a voltage of the data signal.

The voltage of the first node N1 is changed in response to a voltage change amount of the second node N2 by coupling of the first capacitor C1. In an embodiment, for example, the voltage of the first node N1 may be changed by a voltage corresponding to a difference between the voltage of the data signal and the reference power VREF. Here, since the voltage of the reference power VREF is set to a fixed voltage, the voltage of the first node N1 may be determined by the voltage of the data signal.

The second capacitor C2 stores the voltage of the data signal applied to the second node N2.

In the disclosure, the fifth period P5 in which the data signal is input does not overlap the first period P1 to the fourth period P4 in which the threshold voltage is compensated. Therefore, even though the fifth period P5 (or one horizontal period) in which the voltage of the data signal is input is shortened, a threshold voltage compensation period (that is, the first period P1 to the fourth period P4) may be sufficiently secured. Therefore, the display device 1000 of the disclosure may implement a display device of high-resolution and display an image at a high scan rate (or driving frequency).

In the sixth period P6, the fourth scan signal GB is supplied to the fourth scan line SL4. When the fourth scan signal GB is supplied to the fourth scan line SL4, the seventh transistor T7 is turned on. When the seventh transistor T7 is turned on, the voltage of the initialization power VINT may be supplied to the fourth node N4. When the voltage of the initialization power VINT is supplied to the fourth node N4, the charged voltage of the organic capacitor Cle may be discharged.

In the seventh period P7, supply of the emission control signal EM to the emission control line EL is stopped. When the supply of the emission control signal EM to the emission control line EL is stopped, the sixth transistor T6 is turned on.

When the sixth transistor T6 is turned on, the first transistor T1 and the light emitting element LD are electrically connected. At this time, the first transistor T1 supplies the driving current corresponding to the voltage of the first node N1 to the light emitting element LD. Then, the light emitting element LD generates light with a luminance corresponding to the driving current.

Figure 4:
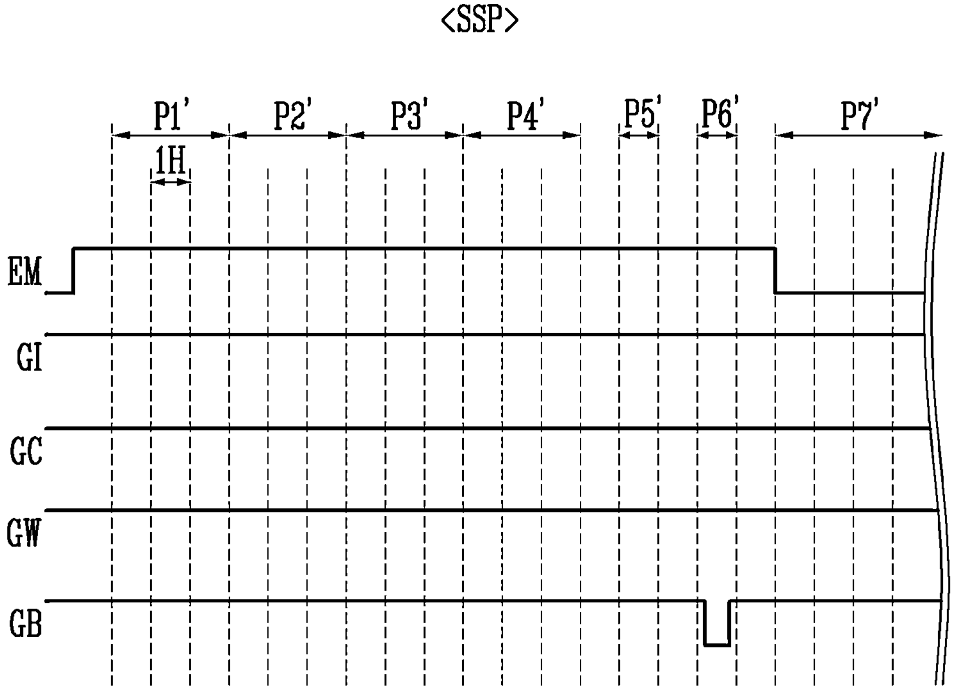
FIG. 4 is a waveform diagram illustrating a method of driving the pixel of FIG. 2 during a self-scan period.

FIG. 4 is a waveform diagram illustrating a method of driving the pixel of FIG. 2 during the self-scan period. The self-scan period SSP is a period in which an image is displayed again without switching a frame as a period in which light is emitted while maintaining a voltage of a previously supplied data signal. In an embodiment, one frame may include one display scan period DSP and one or more self-scan periods SSP. One or more self-scan periods SSP may be successively disposed after the display scan period DSP.

Compared to the display scan period DSP, the threshold voltage compensation operation and the data writing operation are omitted in the self-scan period SSP, and an operation of initializing the light emitting element LD and an emission operation may be performed.

The self-scan period SSP may be set to the same length as the display scan period DSP. In this case, the self-scan period SSP may include a first period P1' to a seventh period P7'.

Referring to FIG. 4, the emission control signal EM is supplied to the emission control line EL in the first period P1' to the fifth period P6. When the emission control signal EM is supplied to the emission control line EL, the sixth transistor T6 is turned off. When the sixth transistor T6 is turned off, electrical connection between the first transistor T1 and the light emitting element LD is cut off, and thus the light emitting element LD is set to the non-emission state. During the first period P1' to the fifth period P5', the scan signals GW, GC, GI, and GB are not supplied to the scan lines SL1 to SL4. Accordingly, during the first period P1' to the fifth period P5', the second transistor T2, the third transistor T3, the fourth transistor T4, the fifth transistor T5, and the seventh transistor T7 are set to a turn-off state.

In the sixth period P6', the fourth scan signal GB is supplied to the fourth scan line SL4. When the fourth scan signal GB is supplied to the fourth scan line SL4, the seventh transistor T7 is turned on. When the seventh transistor T7 is turned on, the voltage of the initialization power VINT may be supplied to the fourth node N4. When the voltage of the initialization power VINT is supplied to the fourth node N4, the charged voltage of the organic capacitor Cle may be discharged.

In the seventh period P7', the supply of the emission control signal EM to the emission control line EL is stopped. When the supply of the emission control signal EM to the emission control line EL is stopped, the sixth transistor T6 is turned on.

When the sixth transistor T6 is turned on, the first transistor T1 and the light emitting element LD are electrically connected. At this time, the first transistor T1 supplies the driving current corresponding to the voltage of the first node N1 to the light emitting element LD. Then, the light emitting element LD generates light of a luminance corresponding to the driving current.

The display device 1000 according to the above-described embodiment of the disclosure may be driven at various driving frequencies (various frame frequencies) because one frame includes the display scan period DSP and the self-scan period SSP.

Figure 5:
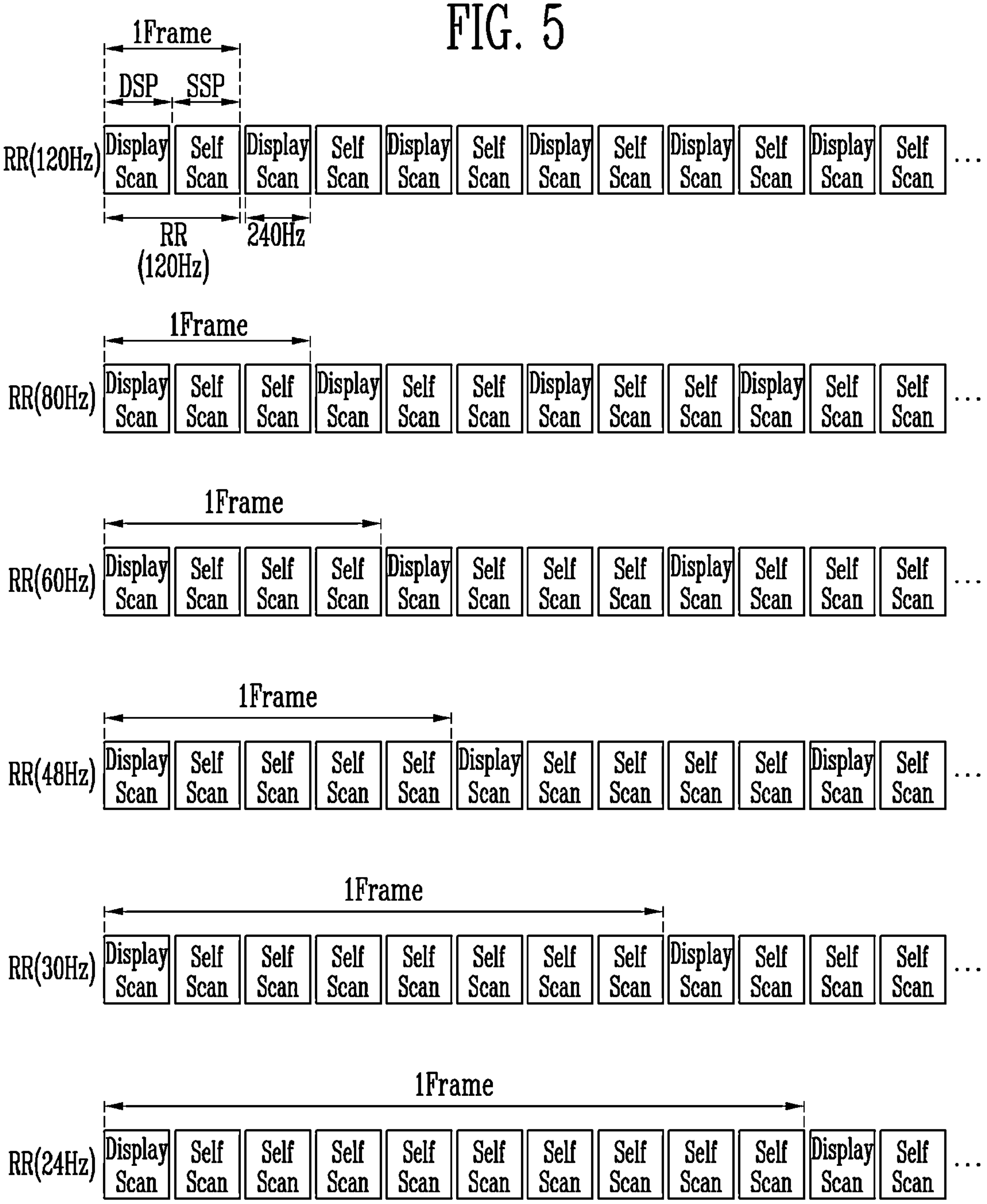
FIG. 5 is a conceptual diagram illustrating a display method of the display device according to an image refresh rate.

FIG. 5 is a conceptual diagram illustrating a display method of the display device according to the image refresh rate.

Figure 8:
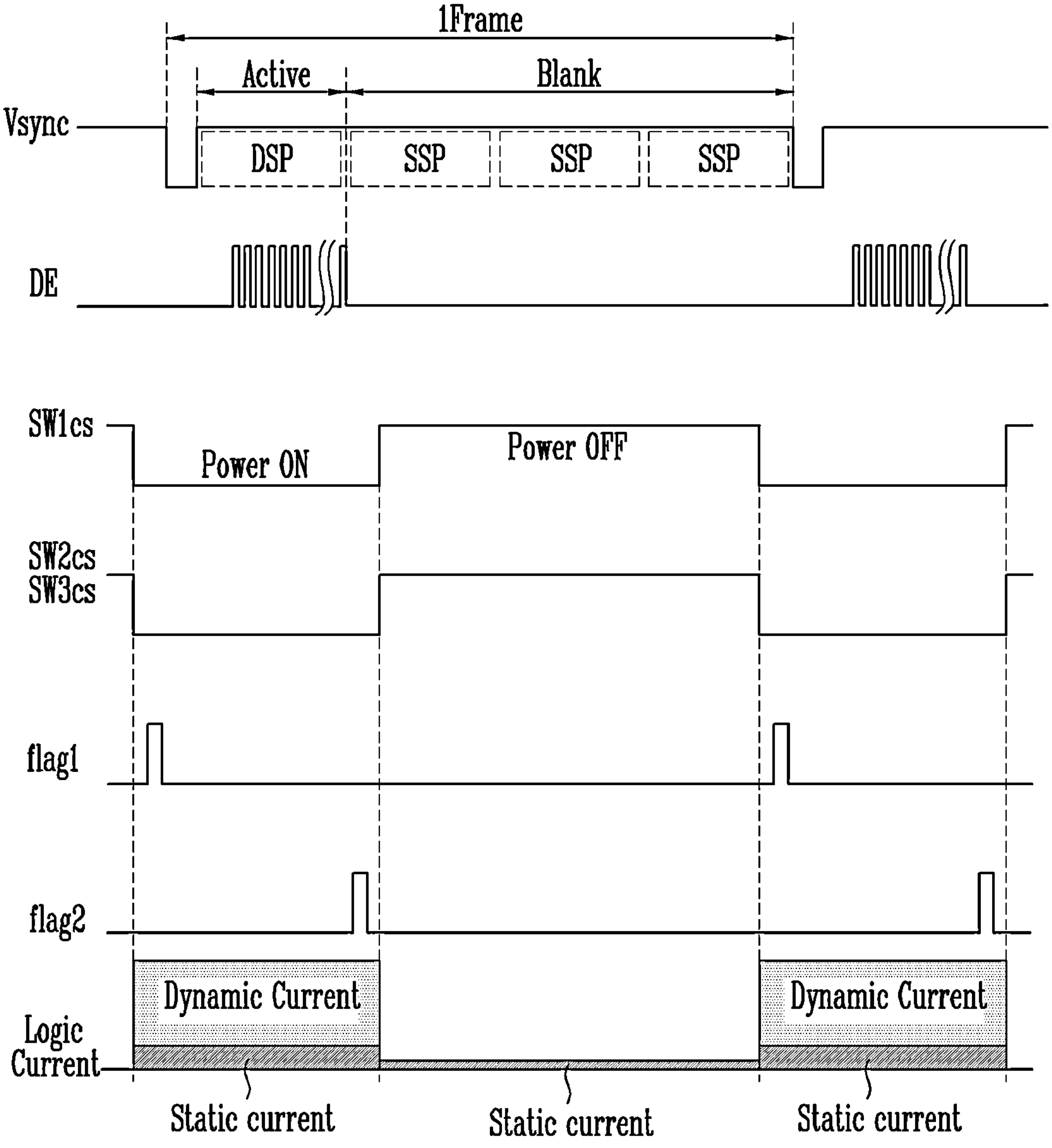
FIG. 8 is a waveform diagram illustrating an operation process of the driving circuit unit shown in FIGS. 6A and 6B.

Referring to FIG. 5, one frame 1 Frame may include an active period (refer to FIG. 8) and a blank period (refer to FIG. 8). The active period may include the display scan period DSP (or a first mode) as a period in which the data signal is supplied. The blank period may include the self-scan period SSP (or a second mode) as a period in which the light emitting element LD emits light while maintaining the data signal supplied in the active period.

The active period may be set to the same length regardless of the image refresh rate RR, and the blank period may be set to have different lengths in correspondence with the image refresh rate RR. For example, as the image refresh rate RR decreases (or a frequency decreases), the blank period may become longer. In this case, as the image refresh rate RR decreases, the number of self-scan periods SSP included in the blank period may increase.

An output frequency of the first scan signal GW, the second scan signal GC, and the third scan signal GI may vary according to the image refresh rate RR. In an embodiment, for example, the frequency of the first scan signal GW, the second scan signal GC, and the third scan signal GI may be increased in proportion to the image refresh rate RR.

In an embodiment, the fourth scan signal GB and the emission control signal EM may be output at a constant frequency regardless of the image refresh rate RR. For example, the fourth scan signal GB and the emission control signal EM may be set to twice a maximum refresh rate that may be implemented in the display device 1000.

In an embodiment, lengths of the display scan period DSP and the self-scan period SSP may be substantially the same. However, the number of self-scan periods SSP included in one frame period may be determined according to the image refresh rate RR.

As shown in FIG. 5, when the display device 1000 is driven at an image refresh rate RR of 120 Hz, one frame period may include one display scan period DSP and one self-scan period SSP. Accordingly, when the display device 1000 is driven at the image refresh rate RR of 120 Hz, each of the pixels PX may repeatedly emit light and does not emit light twice alternately during one frame period.

When the display device 1000 is driven at an image refresh rate RR of 80 Hz, one frame period may include one display scan period DSP and two self-scan periods SSP. Accordingly, when the display device 1000 is driven at the image refresh rate RR of 80 Hz, each of the pixels PX may repeatedly emit light and does not emit light three times alternately during one frame period.

In a method similar to that described above, the display device 1000 may be driven at a driving frequency of 60 Hz, 48 Hz, 30 Hz, 24 Hz, 1 Hz, or the like by adjusting the number of self-scan periods SSP included in one frame period.

That is, in an embodiment of the disclosure, as the driving frequency decreases, the light emitting element LD and the first transistor T1 included in each pixel PX may be initialized at regular periods by increasing the number of self-scan periods SSP included in one frame, and thus the pixel PX may exhibit a uniform luminance characteristic.

Figure 6A:
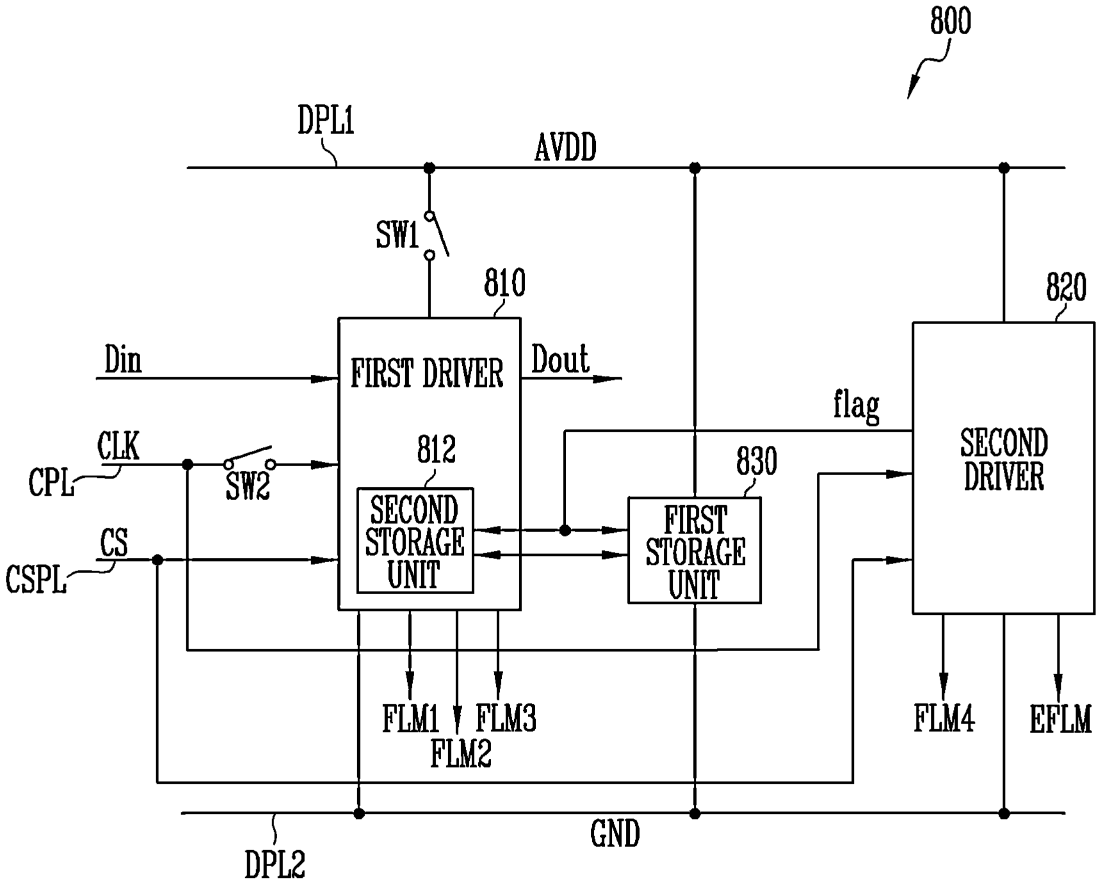
FIGS. 6A and 6B are diagrams illustrating a driving circuit unit according to an embodiment of the disclosure.
Figure 6B:
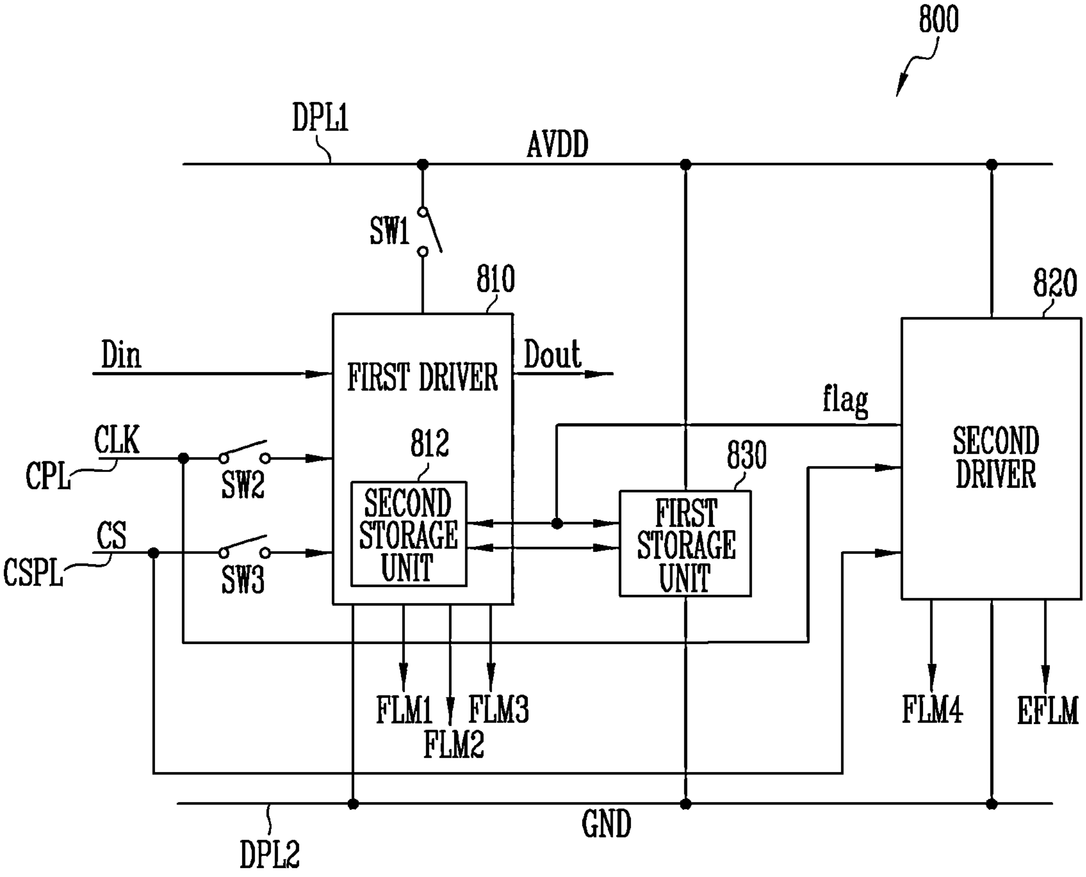

FIGS. 6A and 6B are diagrams illustrating a driving circuit unit according to an embodiment of the disclosure.

Referring to FIG. 6A, the driving circuit unit 800 according to an embodiment of the disclosure may include a first driver 810, a second driver 820 and, a first storage unit 830. In an embodiment, the driving circuit unit 800 including the first driver 810, the second driver 820, and the first storage unit 830 may be implemented as one integrated circuit. In an embodiment, the driving circuit unit 800 may be implemented as one integrated circuit to include the data driver 700. In an embodiment, the first driver 810 and the second driver 820 included in the driving circuit unit 800 may be implemented as separate integrated circuits, respectively.

The first driver 810, the second driver 820, and the first storage unit 830 may be connected to a first power supply line DPL1 (also referred to as "driving power line") and a second power supply line DPL2. Driving power AVDD may be supplied to the first power supply line DPL1, and base power GND may be supplied to the second power supply line DPL2. The driving power AVDD provides a voltage to drive the first driver 810, the second driver 820, and the first storage unit 830. Therefore, when the driving power AVDD is not supplied, the first driver 810, the second driver 820, and the first storage unit 830 are not driven (for example, power off). That is, the first driver 810, the second driver 820, and the first storage unit 830 may be normally driven when the driving power AVDD and the base power GND are supplied.

The first driver 810 may include configurations driven in the display scan period DSP of one frame. In an embodiment, for example, the first driver 810 may include a configuration that corrects the input data Din in response to the threshold voltage of the driving transistor. For example, the first driver 810 may include a configuration that compares input data of a previous frame with input data of a current frame and corrects the input data Din according to a comparison result. For example, the first driver 810 may include a configuration that corrects the input data Din in response to a temperature. In an embodiment, for example, the first driver 810 may include a configuration that corrects the input data Din using accumulated data in which the input data Din is accumulated. The first driver 810 may generate the output data Dout by correcting the input data Din.

In an embodiment, the first driver 810 may include a configuration that generates the first scan start signal FLM1, the second scan start signal FLM2, and the third scan start signal FLM3. The first scan signal GW, the second scan signal GC, and the third scan signal GI may be supplied in the display scan period DSP, and thus the configuration that generates the first scan start signal FLM1, the second scan start signal FLM2, and the third scan start signal FLM3 may be included in the first driver 810.

The first driver 810 may include a second storage unit 812 for storing driving data. The driving data may refer to various data for driving the first driver 810. In an embodiment, for example, the driving data may include the input data of the previous frame and the input data of the current frame. For example, the driving data may include temperature data. For example, the driving data may include various operation data for driving the first driver 810. For example, the driving data may include accumulated data in which the input data Din is accumulated.

The driving circuit unit 800 according to an embodiment of the disclosure may further include a first switch SW1 connected between the first power supply line DPL1 and the first driver 810, and a second switch SW2 connected between a clock supply line CPL to which a clock signal CLK is supplied and the first driver 810. Additionally, the driving circuit unit 800 may further include a third switch SW3 connected between a control signal supply line CSPL to which a control signal CS is supplied and the first driver 810, as shown in FIG. 6B.

In an embodiment, the clock supply line CPL and the control signal supply line CSPL may be set as one supply line. In an embodiment, for example, the clock signal CLK and the control signal CS may be time-divisionally supplied through one supply line, and in this case, the third switch SW3 may be omitted.

The first switch SW1 maintains a turn-on state during the active period (or the display scan period DSP) of one frame and maintains a turn-off state during the blank period (or the self-scan period SSP). When the first switch SW1 is turned off, the driving power AVDD may not be supplied to the first driver 810, and thus the first driver 810 may be set to a power off state.

The second switch SW2 may be turned on or turned off in substantially identically to the first switch SW1. When the second switch SW2 is turned off, the clock signal CLK may not be supplied to the first driver 810, and thus unnecessary power may be prevented from being consumed in the first driver 810 by the clock signal CLK.

The third switch SW3 may be turned on or turned off substantially identically to the first switch SW1. When the third switch SW3 is turned off, the control signal CS may not be supplied to the first driver 810, and thus unnecessary power may be prevented from being consumed in the first driver 810 by the control signal CS.

In an embodiment, since the first driver 810 is set to a power off state when the first switch SW1 is turned off, the second switch SW2 and/or the third switch SW3 may be omitted.

The first storage unit 830 may store the driving data received from the second storage unit 812 or supply the driving data stored therein to the second storage unit 812. In an embodiment, for example, the first storage unit 830 may receive the driving data from the second storage unit 812 and store the driving data as a backup before the first switch SW1 is turned off (or before the first driver 810 is powered off). In addition, the first storage unit 830 may supply the driving data stored therein to the second storage unit 812 again after the first switch SW1 is turned on (or after the first driver 810 is powered on). That is, the driving data received from the second storage unit 812 and stored in the first storage unit 830 may be the same as received from the first storage unit 830 and stored in the second storage unit 812.

That is, before the first driver 810 is powered off, the driving data may be stored in the first storage unit 830 positioned outside the first driver 810. In addition, after the first driver 810 is powered on, the driving data may remain as stored in the second storage unit 812. In this case, the first driver 810 may be stably driven regardless of power off.

The second driver 820 is connected to the clock supply line CPL and the control signal supply line CSPL (as described above, the clock supply line CPL and the control signal supply line CSPL may be set as one supply line). The second driver 820 maintains a power on state during one frame period. Accordingly, the second driver 820 may include configurations continuously driven during one frame period.

In an embodiment, the second driver 820 may include configurations driven in the self-scan period SSP of one frame. In an embodiment, the second driver 820 may further include configurations driven in the display scan period DSP of one frame.

In an embodiment, for example, the second driver 820 may include a configuration that controls a voltage supplied to the pixel PX during the self-scan period SSP. For example, the second driver 820 may include a configuration that generates the fourth scan start signal FLM4 and the emission start signal EFLM. The fourth scan start signal FLM4 and the emission start signal EFLM may be supplied in the display scan period DSP and the self-scan period SSP, and thus the configuration that generates the fourth scan start signal FLM4 and the emission start signal EFLM may be included in the second driver 820.

Figure 7:
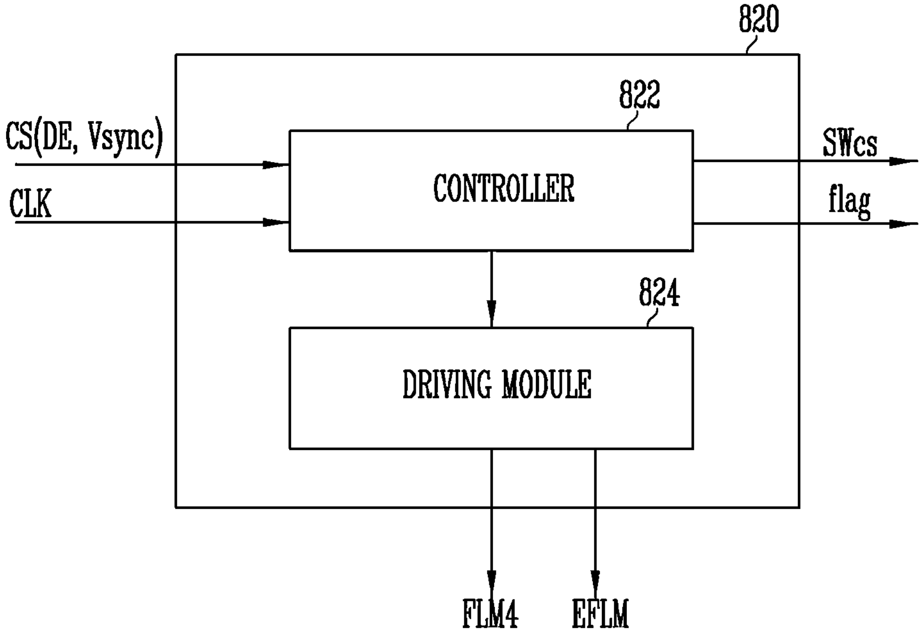
FIG. 7 is a diagram illustrating an embodiment of a second driver shown in FIGS. 6A and 6B.

FIG. 7 is a diagram illustrating an embodiment of the second driver shown in FIGS. 6A and 6B.

Referring to FIG. 7, the second driver 820 according to an embodiment of the disclosure may include a controller 822 and a driving module 824.

The driving module 824 may include configurations driven in the self-scan period SSP. In an embodiment, the driving module 824 may further include configurations driven in the display scan period DSP. In an embodiment, for example, as described above, the driving module 824 may include a configuration that generates the fourth scan start signal FLM4 and a configuration that generates the emission start signal EFLM.

The controller 822 may control the driving module 824. In an embodiment, the controller 822 may generate a switch control signal SWcs for controlling turn-on and turn-off of the first switch SW1, the second switch SW2, and/or the third switch SW3. In an embodiment, the controller 822 may generate a flag signal for controlling the first storage unit 830 and the second storage unit 812.

In an embodiment, the controller 822 may generate the switch control signal SWcs using at least one of a data enable signal DE and a vertical synchronization signal Vsync. In an embodiment, for example, as shown in FIG. 8, the controller 822 may generate a first switch control signal SW1*cs* so that the first switch SW1 is turned on during the active period (or the display scan period DSP) in which the data enable signal DE is supplied and the first switch SW1 is turned off during the blank period (or the self-scan period SSP).

In an embodiment, for example, the controller 822 may generate a second switch control signal SW2*cs* and a third switch control signal SW3*cs* so that the second switch SW2 and the third switch SW3 are turned on during the active period (or the display scan period DSP) in which the data enable signal DE is supplied and the second switch SW2 and the third switch SW3 are turned off during the blank period (or the self-scan period SSP).

Here, the second switch SW2 and/or the third switch SW3 may be turned on and turned off at the same time as the first switch SW1. In this case, the second switch control signal SW2*cs* and the third switch control signal SW3*cs* may be replaced with the first switch control signal SW1*cs*.

In an embodiment, the controller 822 may supply a first flag signal flag1 to the first storage unit 830 and/or the second storage unit 812 before the first switch SW1 maintains a turn-on state and the data enable signal DE is supplied (or before the display scan period). In an embodiment, the controller 822 may supply a second flag signal flag2 to the first storage unit 830 and/or the second storage unit 812 after the first switch SW1 maintains the turn-on state and the data enable signal DE is supplied (or after the display scan period).

Here, the data enable signal DE may be supplied in a pulse form repeating a high level voltage and a low level voltage during the active period (or the display scan period DSP), and may maintain a low level during the blank period (or the self-scan period SSP). Thereafter, supplying the data enable signal DE means supplying a pulse form of data enable signal, and not supplying the data enable signal DE means maintaining the low level voltage.

FIG. 8 is a waveform diagram illustrating an operation process of the driving circuit unit shown in FIGS. 6A and 6B. In FIG. 8, Logic Current may indicate a current amount consumed by the first driver 810 and the second driver 820. Although FIG. 8 shows that the blank period includes three self-scan periods SSP, an embodiment of the disclosure is not limited thereto. For another example, when at least one self-scan period SSP is included in the blank period, an embodiment of the disclosure is applicable.

Referring to FIGS. 6A to 8, one frame period may be divided by the vertical synchronization signal Vsync. In addition, the active period of one frame may be divided by the data enable signal DE. In an embodiment, for example, a period in which the data enable signal DE is supplied may be set as the active period, and a period in which the data enable signal DE is not supplied may be set as the blank period. The active period may include the display scan period DSP, and the blank period may include at least one self-scan period SSP.

The controller 822 may set the first switch SW1 to a turn-on state during the active period of one frame using the first switch control signal SW1*cs*. At this time, the controller 822 may also set the second switch SW2 and the third switch SW3 to a turn-on state using the second switch control signal SW2*cs* and the third switch control signal SW3*cs*.

When the first switch SW1 is turned on, the driving power AVDD may be supplied to the first driver 810, and thus the first driver 810 may be set to a power on state. When the second switch SW2 is turned on, the clock signal CLK may be supplied to the first driver 810. When the third switch SW3 is turned on, the control signal CS may be supplied to the first driver 810. In this case, the first driver 810 may be set to a state in which normal driving is possible.

After the first switch SW1 is turned on and before the pulse form of data enable signal DE indicating the display scan period DSP is supplied, the controller 822 may supply the first flag signal flag1 to the first storage unit. 830 and/or the second storage unit 812. The second storage unit 812 for receiving the first flag signal flag1 may receive and store the driving data from the first storage unit 830.

Thereafter, the first driver 810 may generate the output data Dout using the driving data stored in the second storage unit 812. In addition, the first driver 810 may generate the first scan start signal FLM1, the second scan start signal FLM2, and the third scan start signal FLM3 using the clock signal CLK and the control signal CS. That is, the first driver 810 may generate various signals while being normally driven during the active period.

Similarly, the second driver 820 may also generate various signals while being normally driven during the active period. In an embodiment, for example, the second driver 820 may generate the fourth scan start signal FLM4 and the emission start signal EFLM using the clock signal CLK and the control signal CS.

A current amount consumed during the active period may be divided into a dynamic current and a static current. The static current may refer to a current amount basically consumed when driving power AVDD is supplied to the first driver 810 and the second driver 820. The dynamic current may refer to a current amount consumed while the first driver 810 and the second driver 820 are driven.

The controller 822 may supply the second flag signal flag2 to the first storage unit 830 and/or the second storage unit 812 after supply of the pulse form of data enable signal DE is stopped (or when the data enable signal DE maintains the low level voltage). The first storage unit 830 for receiving the second flag signal flag2 may receive the driving data from the second storage unit 812 and store the driving data.

After the driving data is stored in the first storage unit 830, the controller 822 may set the first switch SW1 to a turn-off state using the first switch control signal SW1*cs*. In addition, the controller 822 may also set the second switch SW2 and the third switch SW3 to a turn-off state using the second switch control signal SW2*cs* and the third switch control signal SW3*cs*.

Since the first switch SW1 is set to the turn-off state, the driving power AVDD is not supplied to the first driver 810 during the blank period. In this case, the first driver 810 is set to a power off state. When the first driver 810 is set to the power off state, the static current consumed during the blank period may be minimized, and thus power consumption may be effectively reduced.

The second driver 820 may generate various signals while being normally driven during the blank period. In an embodiment, for example, the second driver 820 may generate the fourth scan start signal FLM4 and the emission start signal EFLM using the clock signal CLK and the control signal CS. Therefore, even though the first driver 810 is powered off during the blank period, the display device 1000 may be normally driven. In FIG. 8, the dynamic current by the second driver 820 during the blank period is not separately shown.

Figure 9:
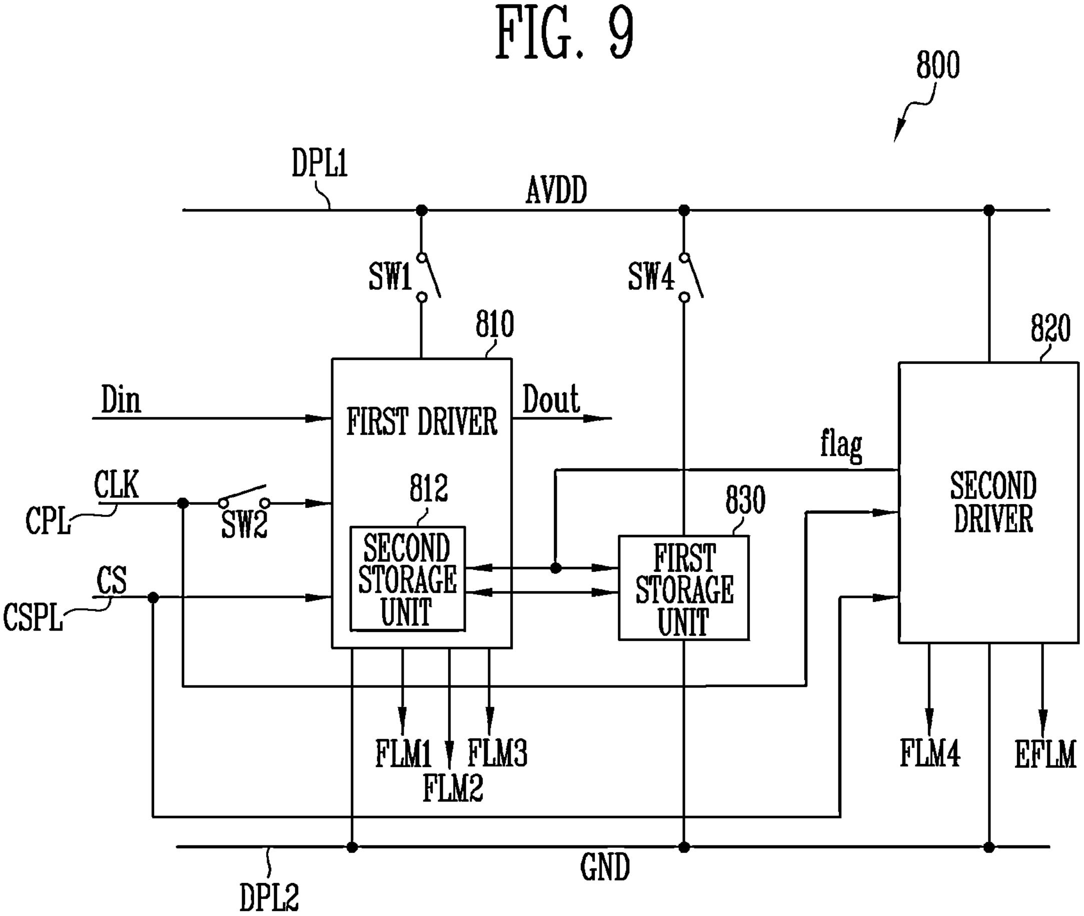
FIG. 9 is a diagram illustrating a driving circuit unit according to an embodiment of the disclosure.
Figure 10A:
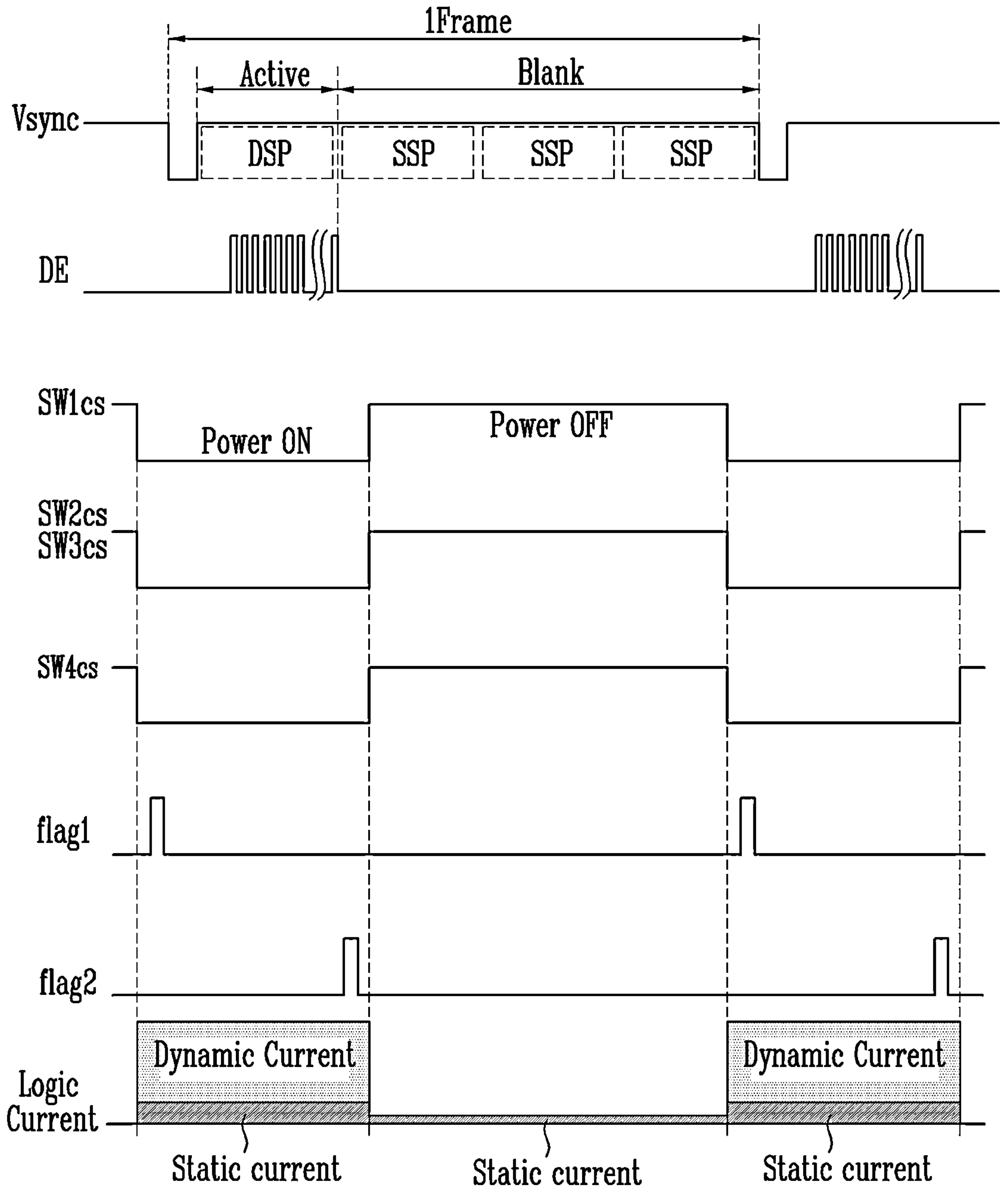
FIGS. 10A and 10B are waveform diagrams illustrating an operation process of the driving circuit unit shown in FIG. 9.
Figure 10B:
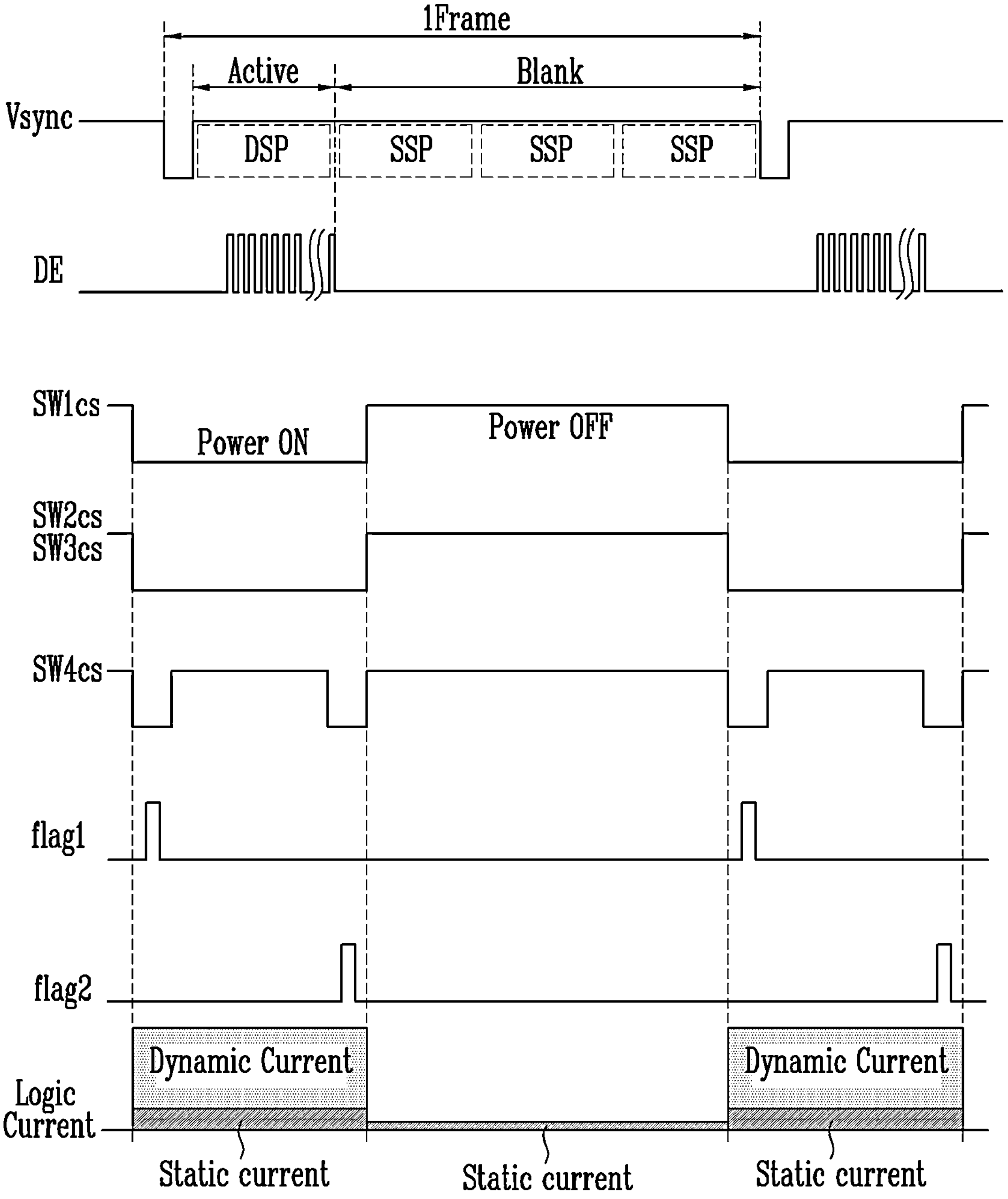

FIG. 9 is a diagram illustrating a driving circuit unit according to an embodiment of the disclosure. FIGS. 10A and 10B are waveform diagrams illustrating an operation process of the driving circuit unit shown in FIG. 9. When describing FIG. 9, an overlapping description of the same configuration as that of FIG. 6A is omitted.

Referring to FIG. 9, the driving circuit unit 800 according to an embodiment of the disclosure includes a fourth switch SW4 connected between the first power supply line DPL1 and the first storage unit 830.

The fourth switch SW4 may be turned on and turned off by a fourth switch control signal SW4*cs* (refer to FIGS. 10A and 10B) supplied from the controller 822. In an embodiment, for example, as shown in FIG. 10A, the fourth switch SW4 may be turned on during the active period of one frame and turned off during the blank period. For example, the fourth switch SW4 may be turned on and turned off at the same time as the first switch SW1. In an embodiment, for example, as shown in FIG. 10B, the fourth switch SW4 may be turned on so as to overlap a period in which the first flag signal flag1 and the second flag signal flag2 are supplied, and may be turned off during other periods.

When the fourth switch SW4 is turned on, the driving power AVDD may be supplied to the first storage unit 830, and thus the first storage unit 830 may be normally driven. In an embodiment, for example, as shown in FIG. 10A, when the fourth switch SW4 is turned on and turned off at the same time as the first switch SW1, the first storage unit 830 may be normally driven during a period in which the driving data is transmitted and received. In an embodiment, for example, as shown in FIG. 10B, when the fourth switch SW4 maintains a turn-on state during a period in which the first flag signal flag1 and the second flag signal flag2 are supplied, the first storage unit may be normally driven during a period in which the driving data is transmitted and received.

When the fourth switch SW4 is turned off, supply of the driving power AVDD to the first storage unit 830 is cut off. At this time, the first storage unit 830 may maintain the stored driving data supplied in a previous period. To this end, the first storage unit 830 may be set as a static random access memory (SRAM). With a retention function of the SRAM, the driving data may be maintained (or restored) even though the driving power AVDD is not supplied. As described above, when the driving power AVDD is not supplied to the first storage unit 830 during the blank period of one frame, power consumption may be additionally reduced.

Figure 11:
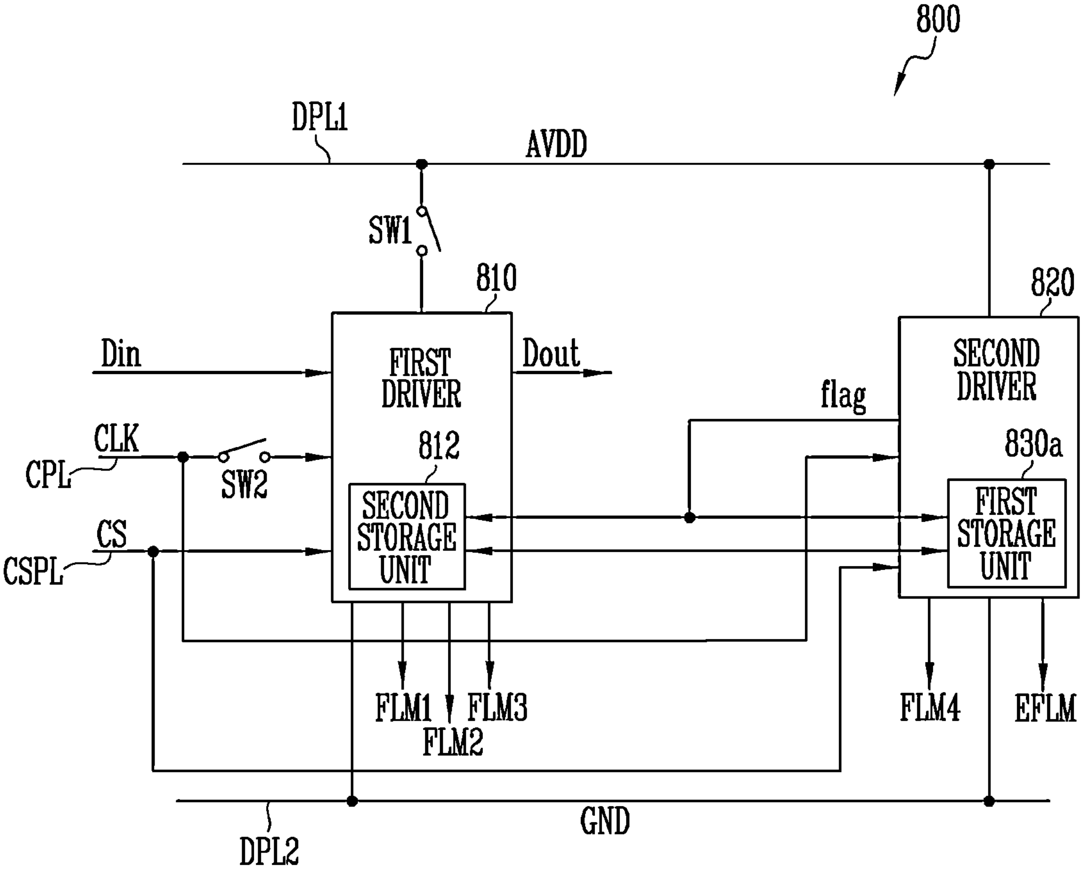
FIG. 11 is a diagram illustrating a driving circuit unit according to an embodiment of the disclosure.

FIG. 11 is a diagram illustrating a driving circuit unit according to an embodiment of the disclosure. When describing 10) FIG. 11, an overlapping description of the same configuration as that of FIG. 6A is omitted.

Referring to FIG. 11, in the driving circuit unit 800 according to an embodiment of the disclosure, a first storage unit 830*a* may be included inside the second driver 820. In this case, the first storage unit 830*a* may be driven by the driving power AVDD supplied to the second driver 820.

Figure 12:
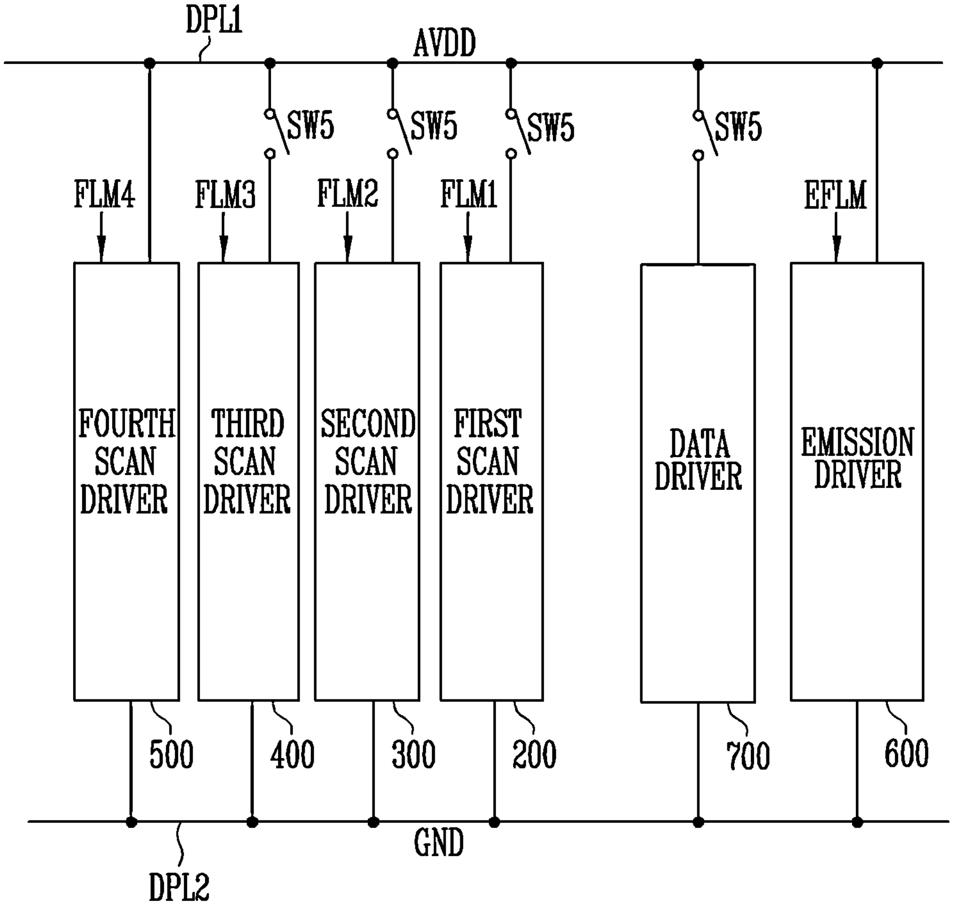
FIG. 12 is a diagram illustrating drivers according to an embodiment of the disclosure.
Figure 13:
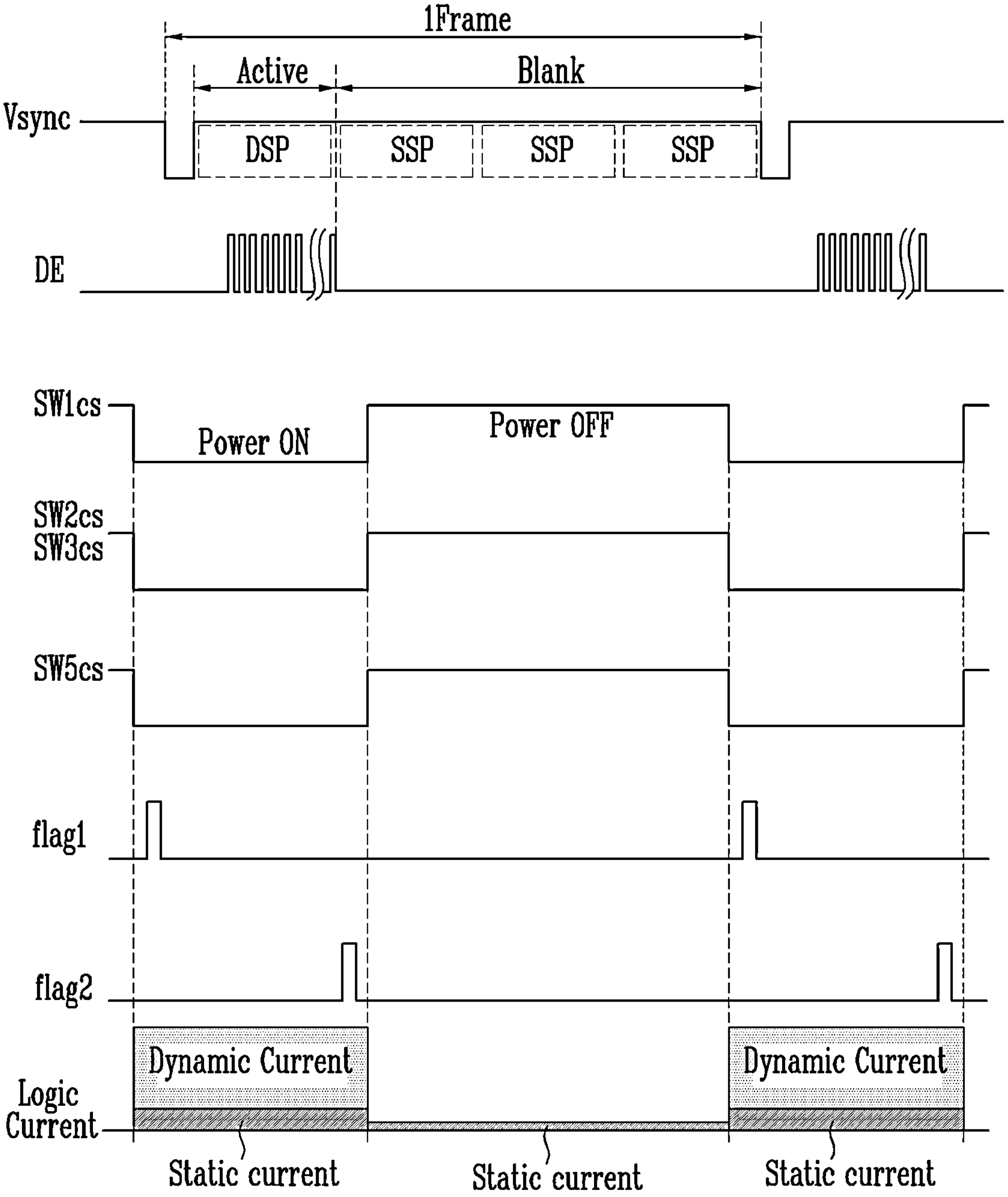
FIG. 13 is a waveform diagram illustrating an operation process of the drivers shown in FIG. 12.

FIG. 12 is a diagram illustrating drivers according to an embodiment of the disclosure. FIG. 13 is a waveform diagram illustrating an operation process of the drivers shown in FIG. 12.

FIG. 12 shows drivers 200, 300, 400, 500, 600, and 700 excluding the driving circuit unit 800 among drivers included in the display device 1000.

Referring to FIG. 12, the first scan driver 200, the second scan driver 300, the third scan driver 400, the fourth scan driver 500, the emission driver 600, and the data driver 700 may be connected to the first power supply line DPL1 and the second power supply line DPL2. That is, the first scan driver 200, the second scan driver 300, the third scan driver 400, the fourth scan driver 500, the emission driver 600, and the data driver 700 may be driven by receiving the driving power AVDD and the base power GND. The driving power AVDD may provide a voltage for driving of the first scan driver 200, the second scan driver 300, the third scan driver 400, the fourth scan driver 500, the emission driver 600, and the data driver 700. Therefore, when the driving power AVDD is not supplied, the first scan driver 200, the second scan driver 300, the third scan driver 400, the fourth scan driver 500, the emission driver 600, and the data driver 700 may be powered off.

The fourth scan driver 500 and the emission driver 600 may be driven during the active period and the blank period of one frame. The first scan driver 200, the second scan driver 300, the third scan driver 400, and the data driver 700 may be driven during the active period of one frame.

A fifth switch SW5 may be provided between the first power supply line DPL1 and each of the first scan driver 200, the second scan driver 300, the third scan driver 400, and the data driver 700. The fifth switch SW5 may be set to a turn-on state during the active period of one frame and set to a turn-off state during the blank period as shown in FIG. 13 by a fifth switch control signal SW5*cs* from the controller 822. In an embodiment, for example, the fifth switch SW5 may be turned on and turned off at the same time as the first switch SW1. In this case, the fifth switch control signal SW5*cs* may be replaced with the first switch control signal SW1*cs*.

When the fifth switch SW5 is turned off, supply of the driving power AVDD to the first scan driver 200, the second scan driver 300, the third scan driver 400, and the data driver 700 is cut off. Then, during the blank period, the first scan driver 200, the second scan driver 300, the third scan driver 400, and the data driver 700 may be set to a power off state, and thus unnecessary power may be prevented from being consumed.

In FIG. 12, the scan drivers 200, 300, and 400 of which driving power is cut off during the blank period may be set variously in correspondence with a structure of the pixel PX. Therefore, scan lines for receiving a scan signal in the active period (for example, the first scan line SL1, the second scan line SL2, and the third scan line SL3 shown in FIG. 1) may be referred to as “display scan lines”, scan drivers for supplying the scan signal to display scan lines (for example, the first scan driver 200, the second scan driver 300, and the third scan driver 400) may be referred to as “display scan drivers”.

In addition, scan lines for receiving the scan signal in the active period and the blank period (for example, the fourth scan line SL4 shown in FIG. 1) may be referred to as “self-scan lines”, and scan drivers for supplying the scan signal to the self-scan lines (for example, the fourth scan driver 500) may be referred to as a “self-scan driver”.

The display scan drivers may be driven during the active period of one frame period and powered off during the blank period. The self-scan drivers may maintain a power-on state during the active period and the blank period of one frame. The number of drivers included in each of the display scan drivers and the self-scan drivers may be set variously in correspondence with the structure of the pixel PX.

Figure 14:
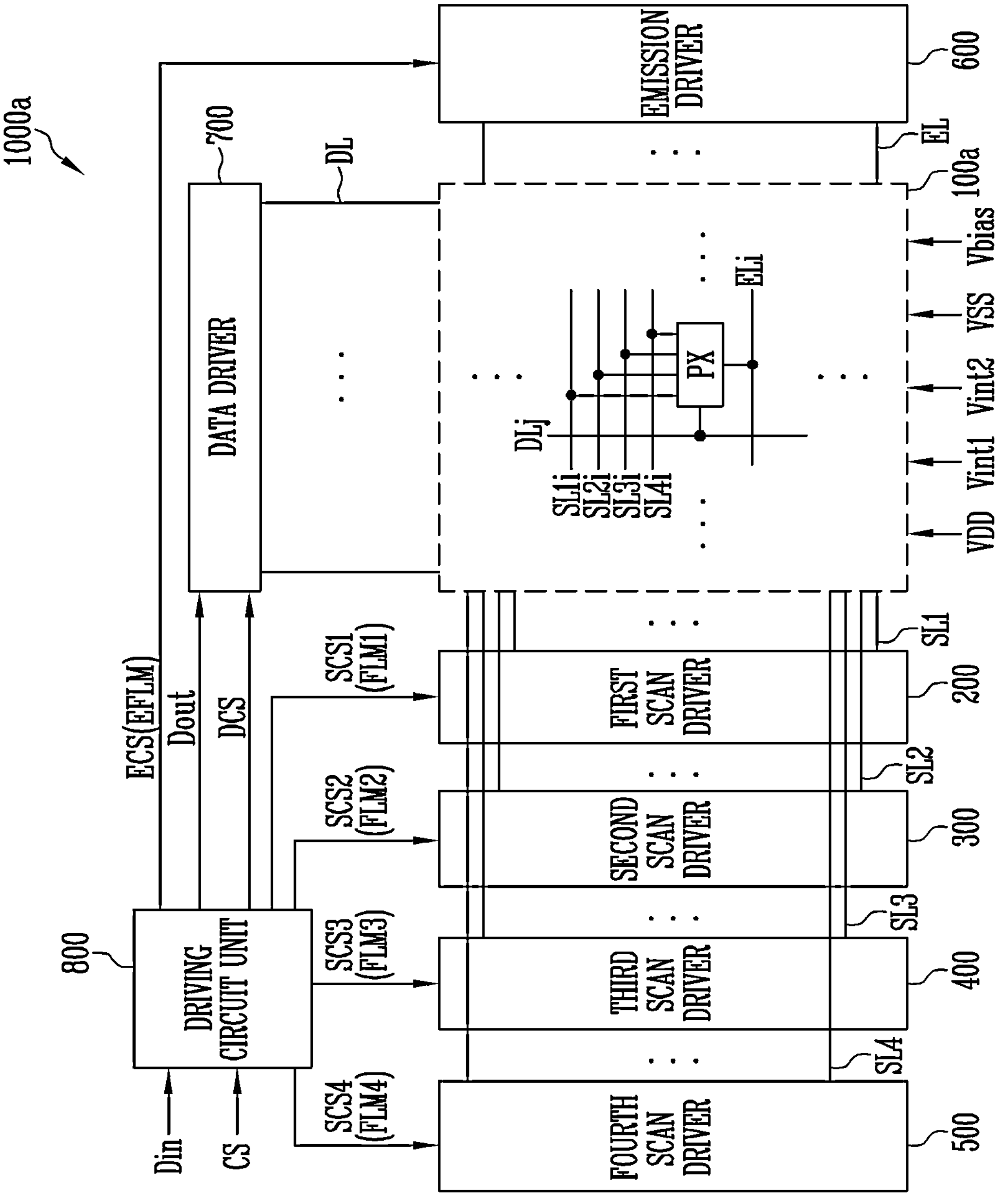
FIG. 14 is a diagram illustrating a display device according to an embodiment of the disclosure.

FIG. 14 is a diagram illustrating a display device according to an embodiment of the disclosure. When describing FIG. 14, an overlapping description of a configuration similar or identical to that of FIG. 1 is omitted.

Referring to FIG. 14, the display device 1000*a* according to an embodiment of the disclosure may include a pixel unit 100*a*, the scan drivers 200, 300, 400, and 500, the emission driver 600, the data driver 700, and the driving circuit unit 800 (or the timing controller).

In an embodiment, the display device 1000*a* may further include a power supply for supplying the voltage of the first power VDD, the voltage of the second power VSS, a voltage of first initialization power Vint1, a voltage of second initialization power Vint2, and a voltage of bias power Vbias to the pixel unit 100*a*.

The first initialization power Vint1 may be power for initializing the gate electrode of the driving transistor. The first initialization power Vint1 may be set to a voltage lower than the voltage of the data signal.

The second initialization power Vint2 may be power for initializing the first electrode of the light emitting element LD. The second initialization power Vint2 may be set to a voltage higher than the voltage of the second power VSS.

The bias power Vbias may be power for applying a bias (for example, on bias) to the driving transistor. In an embodiment, for example, the bias power Vbias may be set to a voltage capable of applying the on bias to the driving transistor.

The display device 1000*a* may display an image at various image refresh rates (driving frequencies, or screen reproduction rates) according to a driving condition.

The pixel unit 100*a* includes the pixels PX respectively connected to the data lines DL, the scan lines SL1, SL2, SL3, and SL4, and the emission control lines EL. The pixels PX may receive the first power VDD, the second power VSS, the first initialization power Vint1, the second initialization power Vint2, and the bias power Vbias from the outside.

The first scan driver 200 may supply the first scan signal to the first scan lines SL1 in response to the first driving control signal SCS1 supplied from the driving circuit unit 800. In an embodiment, for example, the first scan driver 200 may sequentially supply the first scan signal to the first scan lines SL1. The first scan signal may be set to a gate-on voltage (for example, a low level). The transistor included in the pixel PX and receiving the first scan signal is set to a turn-on state when the first scan signal is supplied.

The second scan driver 300 may supply the second scan signal to the second scan lines SL2 in response to the second driving control signal SCS2 supplied from the driving circuit unit 800. In an embodiment, the second scan driver 300 may sequentially supply the second scan signal to the second scan lines SL2 while shifting the second scan start signal FLM2 included in the second driving control signal SCS2 in response to the clock signal. The second scan signal may be set to a gate-on voltage (for example, a high level). The transistor included in the pixel PX and receiving the second scan signal is set to a turn-on state when the second scan signal is supplied.

The third scan driver 400 may supply the third scan signal to the third scan lines SL3 in response to the third driving control signal SCS3 supplied from the driving circuit unit 800. In an embodiment, the third scan driver 400 may sequentially supply the third scan signal to the third scan lines SL3 while shifting the third scan start signal FLM3 included in the third driving control signal SCS3 in response to the clock signal. The third scan signal may be set to a gate-on voltage (for example, a high level). The transistor included in the pixel PX and receiving the third scan signal is set to a turn-on state when the third scan signal is supplied.

The fourth scan driver 500 may supply the fourth scan signal to the fourth scan lines SL4 in response to the fourth driving control signal SCS4 supplied from the driving circuit unit 800. In an embodiment, the fourth scan driver 500 may sequentially supply the fourth scan signal to the fourth scan lines SL4 while shifting the fourth scan start signal FLM4 included in the fourth driving control signal SCS4 in response to the clock signal. The fourth scan signal may be set to a gate-on voltage (for example, a low level). The transistor included in the pixel PX and receiving the fourth scan signal is set to a turn-on state when the fourth scan signal is supplied.

The emission driver 600 may supply the emission control signal to the emission control lines EL in response to the fifth driving control signal ECS supplied from the driving circuit unit 800. In an embodiment, the emission driver 600 may sequentially supply the emission control signal to the emission control lines EL while shifting the emission start signal EFLM included in the fifth driving control signal ECS in response to the clock signal. The emission control signal may be set to a gate-off voltage (for example, a high level). A transistor included in the pixel PX and receiving the emission control signal is set to a turn-off state when the emission control signal is supplied.

The data driver 700 may receive the sixth driving control signal DCS and the output data Dout from the driving circuit unit 800. The data driver 700 may supply the data signal to the data lines DL in response to the sixth driving control signal DCS. In an embodiment, for example, the data driver 700 may generate the analog data signal using the digital output data Dout and supply the generated data signal to the data lines DL in synchronization with the first scan signal.

The driving circuit unit 800 may generate the first driving control signal SCS1, the second driving control signal SCS2, the third driving control signal SCS3, the fourth driving control signal SCS4, the fifth driving control signal ECS, and the sixth driving control signal DCS in response to the control signal supplied from the outside. In addition, the driving circuit unit 800 may correct (and/or rearrange) input data Din supplied from the outside to generate the output data Dout and supply the output data Dout to the data driver 700.

Figure 15:
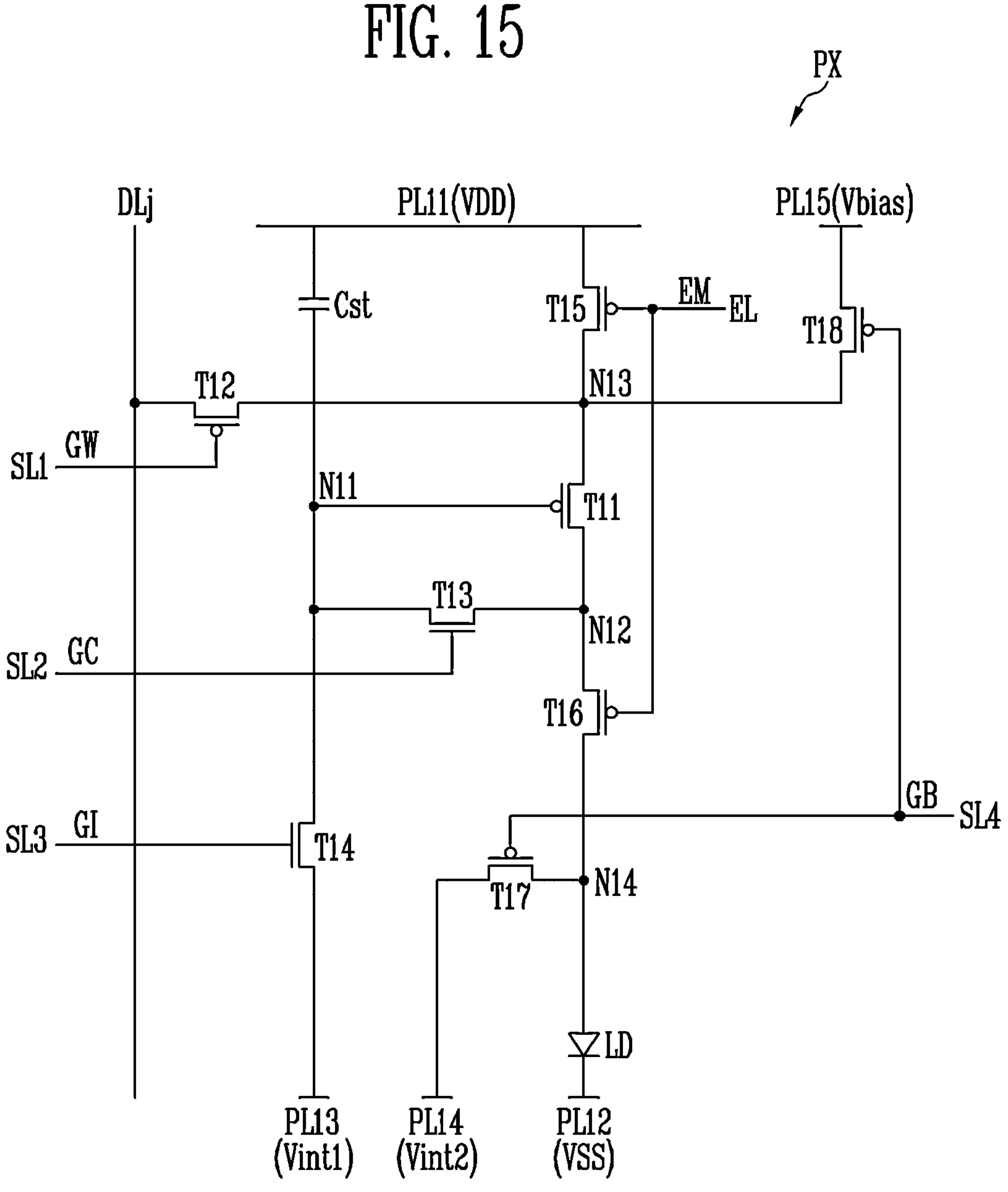
FIG. 15 is a circuit diagram illustrating an embodiment of a pixel shown in FIG. 14.

FIG. 15 is a circuit diagram illustrating an embodiment of the pixel shown in FIG. 14. In FIG. 15, the pixel PX positioned on the i-th horizontal line and the j-th vertical line is exemplarily shown.

Referring to FIG. 15, the pixel PX according to an embodiment of the disclosure includes the light emitting element LD and the pixel circuit for controlling the current amount supplied to the light emitting element LD.

The light emitting element LD may be connected between a first power line PL11 to which the first power VDD is supplied and a second power line PL12 to which the second power VSS is supplied. In an embodiment, for example, the first electrode (for example, the anode electrode) of the light emitting element LD may be connected to the first power line PL11 via a fourth node N14 and the pixel circuit, and the second electrode (for example, the cathode electrode) of the light emitting element LD may be connected to the second power line PL12. The light emitting element LD may emit light with a luminance corresponding to the driving current supplied from the pixel circuit.

The pixel circuit may include at least one transistor and at least one capacitor. In an embodiment, for example, the pixel circuit may include a first transistor T11 (or a driving transistor), a second transistor T12, a third transistor T13, a fourth transistor T14, a fifth transistor T15, a sixth transistor T16, a seventh transistor T17, an eighth transistor T18, and a storage capacitor Cst.

A first electrode of the first transistor T11 (or the driving transistor) may be connected to a third node N13, and a second electrode may be connected to a second node N12. In addition, a gate electrode of the first transistor T11 may be connected to a first node N11. The first transistor T11 may control the current amount supplied from the first power VDD to the second power VSS via the light emitting element LD in response to a voltage of the first node N11. To this end, the first power VDD may be set to a voltage higher than the voltage of the second power VSS.

The second transistor T12 may be connected between the data line DLj and the third node N13. In addition, a gate electrode of the second transistor T12 may be connected to the first scan line SL1. The second transistor T12 may be turned on when the first scan signal GW is supplied to the first scan line SL1 to electrically connect the data line DLj and the third node N13.

The third transistor T13 may be connected between the first node N11 and the second node N12. In addition, a gate electrode of the third transistor T13 may be connected to the second scan line SL2. The third transistor T13 may be turned on when the second scan signal GC is supplied to the second scan line SL2 to electrically connect the first node N11 and the second node N12. When the third transistor T13 is turned on, the first transistor T11 is connected in a diode form.

The fourth transistor T14 is connected between the first node N11 and a third power line PL13 to which the first initialization power Vint1 is supplied. In addition, a gate electrode of the fourth transistor T14 is connected to the third scan line SL3. The fourth transistor T14 may be turned on when the third scan signal GI is supplied to the third scan line SL3 to supply a voltage of the first initialization power Vint1 to the first node N11. Here, the voltage of the first initialization power Vint1 may be set to a voltage lower than the voltage of the data signal supplied to the data line DLj.

The fifth transistor T15 is connected between the first power line PL11 to which the first power VDD is supplied and the third node N13. In addition, a gate electrode of the fifth transistor T15 may be connected to the emission control line EL. The fifth transistor T15 may be turned off when the emission control signal EM is supplied to the emission control line EL, and may be turned on in other cases.

The sixth transistor T16 is connected between the second node N12 and the fourth node N14. In addition, a gate electrode of the sixth transistor T16 may be connected to the emission control line EL. The sixth transistor T16 may be turned off when the emission control signal EM is supplied to the emission control line EL, and may be turned on in other cases.

The seventh transistor T17 is connected between the fourth node N14 and a fourth power line PL14 to which the second initialization power Vint2 is supplied. In addition, a gate electrode of the seventh transistor T17 may be connected to the fourth scan line SL4. The seventh transistor T17 may be turned on when the fourth scan signal GB is supplied to the fourth scan line SL4 to supply a voltage of the second initialization power Vint2 to the fourth node N14.

When the voltage of the second initialization power Vint2 is supplied to the fourth node N14, a parasitic capacitor of the light emitting element LD may be discharged. As a residual voltage charged in the parasitic capacitor of the light emitting element LD is discharged (or removed), unintended fine light emission may be prevented. Therefore, black expression capability of the pixel PX may be improved.

The first initialization power Vint1 and the second initialization power Vint2 may be set to different voltages. That is, a voltage for initializing the first node N11 and a voltage for initializing the fourth node N14 may be set differently. However, this is exemplary, and the voltage of the first initialization power Vint1 and the voltage of the second initialization power Vint2 may be substantially the same.

The eighth transistor T18 is connected between the third node N13 and a fifth power line PL15 to which the bias power Vbias is supplied. In addition, a gate electrode of the eighth transistor T18 may be connected to the fourth scan line SL4. The eighth transistor T18 may be turned on when the fourth scan signal GB is supplied to the fourth scan line SL4 to supply a voltage of the bias power Vbias to the third node N13.

The storage capacitor Cst is connected between the first power line PL11 and the first node N11. The storage capacitor Cst may store a voltage applied to the first node N11.

In an embodiment, the first transistor T11, the second transistor T12, the fifth transistor T15, the sixth transistor T16, the seventh transistor T17, and the eighth transistor T18 may be formed of polysilicon semiconductors. In an embodiment, for example, the first transistor T11, the second transistor T12, the fifth transistor T15, the sixth transistor T16, the seventh transistor T17, and the eighth transistor T18 may include a polysilicon semiconductor layer formed through a low temperature poly-silicon ("LTPS") process as an active layer (channel).

In addition, the first transistor T11, the second transistor T12, the fifth transistor T15, the sixth transistor T16, the seventh transistor T17, and the eighth transistor T18 may be P-type transistors (for example, PMOS transistors). Accordingly, a gate on voltage turning on the first transistor T11, the second transistor T12, the fifth transistor T15, the sixth transistor T16, the seventh transistor T17, and the eighth transistor T18 may be a logic low level. Since the polysilicon semiconductor transistor has an advantage of fast response speed, the polysilicon semiconductor transistor may be applied to a switching element requiring fast switching.

In an embodiment, the third transistor T13 and the fourth transistor T14 may be formed of oxide semiconductor transistors. In an embodiment, for example, the third transistor T13 and the fourth transistor T14 may be N-type oxide semiconductor transistors (for example, NMOS transistors) and may include an oxide semiconductor layer as an active layer. Accordingly, a gate on voltage turning on the third transistor T13 and the fourth transistor T14 may be a logic high level.

The oxide semiconductor transistor may be processed at a low temperature and has charge mobility lower than charge mobility of the polysilicon semiconductor transistor. That is, the oxide semiconductor transistor has an excellent off current characteristic. Therefore, when the third transistor T13 and the fourth transistor T14 are formed of oxide semiconductor transistors, a leakage current from the first node N11 due to low-frequency driving may be effectively minimized, thereby improving display quality.

Figure 16:
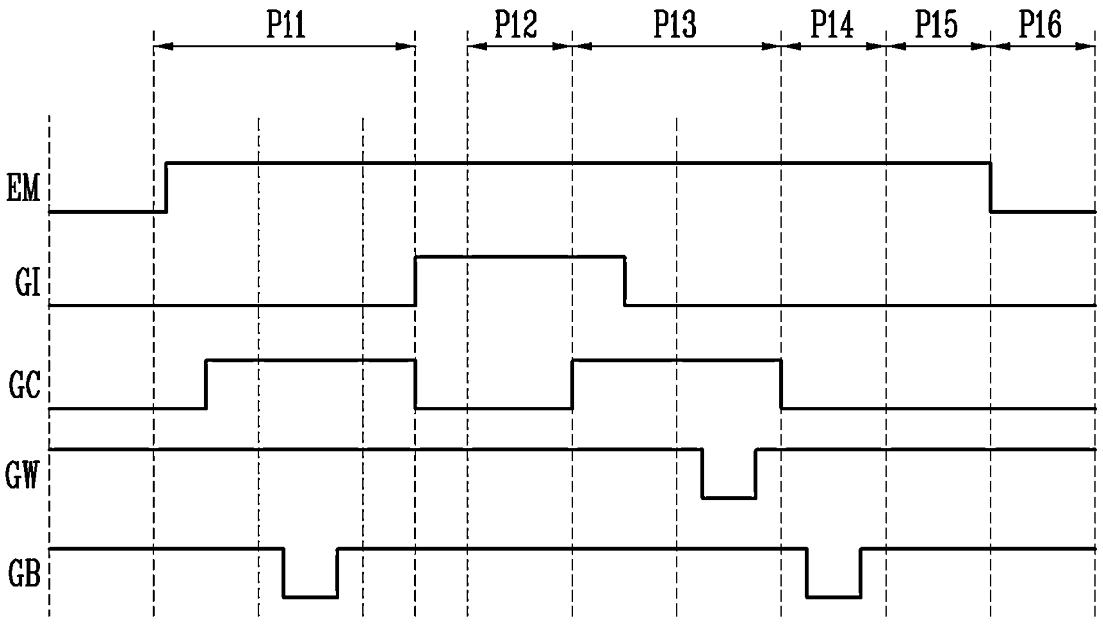
FIG. 16 is a waveform diagram illustrating a method of driving the pixels of FIG. 15 during the display scan period.

FIG. 16 is a waveform diagram illustrating a method of driving the pixels of FIG. 15 during the display scan period.

Referring to FIG. 16, the display scan period DSP may include first to sixteenth periods P11 to P16.

The emission control signal EM is supplied to the emission control line EL during the first to fifteenth periods P11 to P15. When the emission control signal EM is supplied to the emission control line EL, the fifth transistor T15 and the sixth transistor T16 are turned off. When the fifth transistor T15 is turned off, electrical connection between the first power line PL11 and the first transistor T11 is cut off. When the sixth transistor T16 is turned off, electrical connection between the first transistor T11 and the light emitting element LD is cut off. Therefore, during the first to fifteenth periods P11 to P15 in which the emission control signal EM is supplied, the light emitting element LD is set to a non-emission state.

In the first period P11, the second scan signal GC is supplied to the second scan line SL2. When the second scan signal GC is supplied to the second scan line SL2, the third transistor T13 is turned on. When the third transistor T13 is turned on, the first node N11 and the second node N12 are electrically connected, and thus the first transistor T11 is connected in a diode form.

In the first period P11, the fourth scan signal GB is supplied to the fourth scan line SL4 so as to partially overlap the second scan signal GC. When the fourth scan signal GB is supplied to the fourth scan line SL4, the seventh transistor T17 and the eighth transistor T18 are turned on.

When the seventh transistor T17 is turned on, the voltage of the second initialization power Vint2 is supplied to the fourth node N14. At this time, the light emitting element LD may be initialized with the voltage of the second initialization power Vint2.

When the eighth transistor T18 is turned on, the voltage of the bias power Vbias is supplied to the third node N13. The voltage of the bias power Vbias supplied to the third node N13 may be transferred to the first node N11 via the first transistor T11 connected in the diode form. At this time, a voltage difference between the third node N13 and the first node N11 may be reduced to a threshold voltage level of the first transistor T11. Therefore, a magnitude of a gate-source voltage of the first transistor T11 may be very low during the first period P11. In an embodiment, for example, during the first period P11, the first transistor T11 may be set to an off-bias state.

In the second period P12, the third scan signal GI is supplied to the third scan line SL3. When the third scan signal GI is supplied to the third scan line SL3, the fourth transistor T14 is turned on. When the fourth transistor T14 is turned on, the voltage of the first initialization power Vint1 may be supplied to the first node N11, and thus the gate electrode of the first transistor T11 may be initialized by the voltage of the first initialization power Vint1. During the second period P12, the on bias may be applied to the first transistor T11, and a hysteresis characteristic may change (a threshold voltage is shifted).

In the third period P13, the second scan signal GC is supplied to the second scan line SL2, and after the second scan signal GC is supplied, the first scan signal GW is supplied to the first scan line SL1. When the second scan signal GC is supplied to the second scan line SL2, the third transistor T13 is turned on, and thus the first transistor T11 is connected in the diode form.

When the first scan signal GW is supplied to the first scan line SL1, the second transistor T12 is turned on. When the second transistor T12 is turned on, the data signal from the data line DLj is supplied to the third node N13. The data signal supplied to the third node N13 is supplied to the first node N11 via the first transistor T11 connected in the diode form. At this time, a voltage obtained by subtracting an absolute value threshold voltage of the first transistor T11 from the voltage of the data signal may be applied to the first node N11.

During the third period P13, the storage capacitor Cst may store the voltage applied to the first node N11, that is, a voltage corresponding to the data signal and the threshold voltage of the first transistor T11. Additionally, since supply of the second scan signal GC is maintained after supply of the first scan signal GW is stopped during the third period P13, the threshold voltage of the first transistor T11 may be compensated during a sufficient time.

In the fourth period P14, the fourth scan signal GB is supplied to the fourth scan line SL4, and thus the seventh transistor T17 and the eighth transistor T18 are turned on. When the seventh transistor T17 is turned on, the light emitting element LD may be initialized by the voltage of the second initialization power Vint2.

When the eighth transistor T18 is turned on, the bias voltage Vbias may be supplied to the third node N13, and thus the first transistor T11 may be set to an on-bias state. A sufficient margin time is required between the fourth period P14 and the sixth period P16 so that the first transistor T11 is set to a stable on-bias state. Therefore, the fifth period P15 in which the scan signals are not supplied may be inserted between the fourth period P14 and the sixth period P16.

In the sixth period P16, supply of the emission control signal EM to the emission control line EL is stopped (that is, a gate-on voltage is applied to the emission control line EL), and thus the fifth transistor T15 and the sixth transistor T16 are turned on. When the fifth transistor T15 is turned on, the first power line PL11 and the third node N13 are electrically connected. When the sixth transistor T16 is turned on, the first transistor T11 and the light emitting element LD are electrically connected. During the sixth period P16, the first transistor T11 may supply a driving current corresponding to the voltage of the first node N11 from the first power line PL11 to the second power line PL12 via the light emitting element LD, and thus the light emitting element LD may emit light with a luminance corresponding to the driving current.

Figure 17:
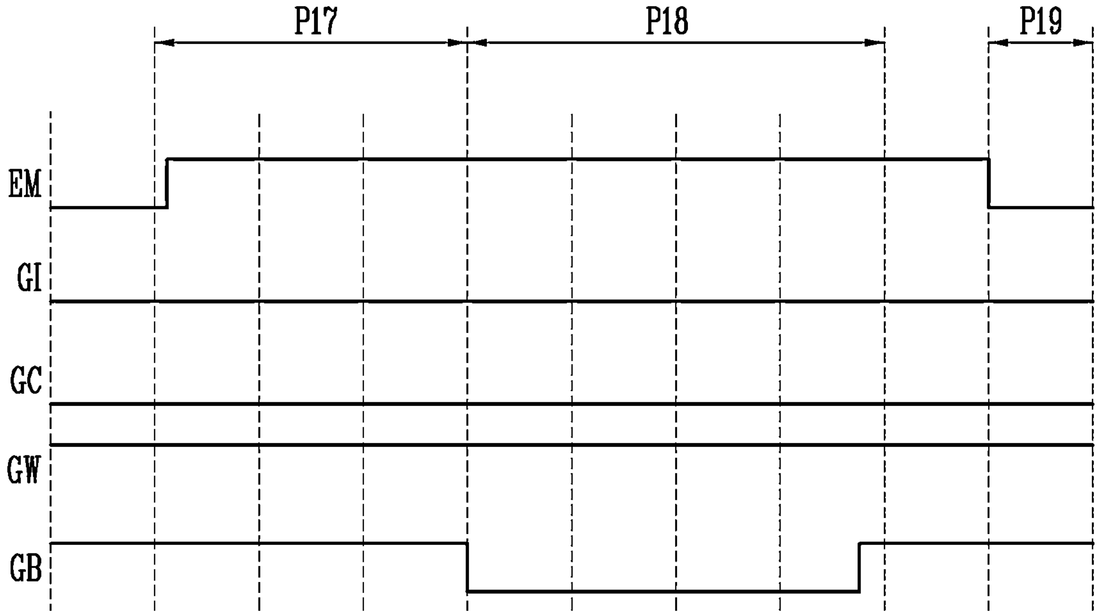
FIG. 17 is a waveform diagram illustrating a method of driving the pixel of FIG. 15 during the self-scan period.

FIG. 17 is a waveform diagram illustrating a method of driving the pixel of FIG. 15 during the self-scan period. The self-scan period SSP may be set to the same length as the display scan period DSP.

Referring to FIG. 17, the self-scan period SSP may include seventh to ninth periods P17 to P19.

During the seventh period P17 and the eighth period P18, the emission control signal EM is supplied to the emission control line EL. When the emission control signal EM is supplied to the emission control line EL, the fifth transistor T15 and the sixth transistor T16 are turned off. When the fifth transistor T15 is turned off, electrical connection between the first power line PL11 and the first transistor T11 is cut off. When the sixth transistor T16 is turned off, electrical connection between the first transistor T11 and the light emitting element LD is cut off. Therefore, during the seventh period P17 to the eighth period P18 in which the emission control signal EM is supplied, the light emitting element LD is set to a non-emission state.

In the eighth period P18, the fourth scan signal GB is supplied to the fourth scan line SL4. When the fourth scan signal GB is supplied to the fourth scan line SL4, the seventh transistor T17 and the eighth transistor T18 are turned on.

When the eighth transistor T18 is turned on, the voltage of the bias power Vbias is supplied to the third node N13. When the voltage of the bias power Vbias is supplied to the third node N13, the first transistor T11 may be set to an on bias state. That is, the first transistor T11 may be periodically set to the on bias state according to the display scan period DSP and the self-scan period SSP, and thus a luminance change of the first transistor T11 may be effectively minimized.

When the seventh transistor T17 is turned on, the voltage of the second initialization power Vint2 may be supplied to the fourth node N14, and thus the light emitting element LD may be initialized by the voltage of the second initialization power Vint2.

Although the above has been described with reference to the embodiments of the disclosure, those skilled in the art will understand that the disclosure may be variously corrected and modified within the scope without departing from the spirit and scope of the disclosure described in the claims.

What is claimed is:

1. A driving circuit unit comprising:
a first driver configured to be driven during a display scan period included in an active period of one frame;
a second driver configured to be driven during at least one self-scan period included in a blank period of the one frame;
a first switch connected between a driving power line to which driving power is supplied and the first driver, configured to be turned on in the active period, and configured to be turned off in the blank period; and
a first storage unit disposed outside the first driver and configured to receive and store driving data from the first driver before the first switch is turned off,
wherein a second storage unit in the first driver is configured to retrieve and store the driving data from the first storage unit after the first switch is turned on again.

2. The driving circuit unit according to claim 1, wherein the second driver includes a controller configured to receive a control signal including a data enable signal and a vertical synchronization signal and control turn-on and turn-off of the first switch using at least one of the data enable signal and the vertical synchronization signal.

3. The driving circuit unit according to claim 2, further comprising:

a second switch connected between a clock supply line to which a clock signal is supplied and the first driver, configured to be turned on in the active period, and configured to be turned off in the blank period by the controller.

4. The driving circuit unit according to claim 2, further comprising:

a third switch connected between a control signal supply line to which the control signal is supplied and the first driver, configured to be turned on in the active period, and configured to be turned off in the blank period by the controller.

5. The driving circuit unit according to claim 2, wherein the controller turns on the first switch before the data enable signal of a pulse form is supplied, and turns off the first switch after the data enable signal of the pulse form is supplied.

6. The driving circuit unit according to claim 1, wherein the second storage unit receives and stores the driving data from the first storage unit in response to a first flag signal supplied from the controller, and the first storage unit receives and stores the driving data from the second storage unit in response to a second flag signal supplied from the controller.

7. The driving circuit unit according to claim 6, wherein the controller sequentially supplies the first flag signal and the second flag signal to overlap a period in which the first switch is turned on and the driving power is supplied to the first driver.

8. The driving circuit unit according to claim 7, wherein the controller supplies the first flag signal before the data enable signal of a pulse form is supplied, and supplies the second flag signal after the data enable signal of the pulse form is supplied.

9. The driving circuit unit according to claim 6, wherein the first storage unit is a static random access memory (SRAM).

10. The driving circuit unit according to claim 9, further comprising:

a fourth switch connected between the driving power line and the first storage unit and configured to be turned on to overlap a period in which the first flag signal is supplied and a period in which the second flag signal is supplied.

11. The driving circuit unit according to claim 1, wherein the second driver is driven during the display scan period.

12. The driving circuit unit according to claim 1, wherein the first storage unit is included in the second driver.

13. A driving circuit unit driven in a first mode and a second mode, comprising:

a driver configured to receive a driving voltage when driven in the first mode and does not receive the driving voltage when driven in the second mode; and a first storage unit disposed outside the driver and configured to receive and store driving data of the driver when changed from the first mode to the second mode, wherein a second storage unit in the driver receives the driving data from the first storage unit when changed from the second mode to the first mode.

14. The driving circuit unit according to claim 13, wherein one frame period includes a period of the first mode and a period of the second mode.

15. The driving circuit unit according to claim 14, wherein the period of the second mode included in the one frame period increases as a driving frequency for the driving circuit decreases.

16. A display device comprising:

pixels connected to display scan lines, self-scan lines, emission control lines, and data lines;

at least one display scan driver configured to supply a scan signal to the display scan lines during an active period of one frame;

at least one self-scan driver configured to supply the scan signal to the self-scan lines during the active period and a blank period of the one frame;

a data driver configured to supply a data signal to the data lines during the active period;

an emission driver configured to supply an emission control signal to the emission control lines during the active period and the blank period; and a driving circuit unit configured to control the display scan driver, the self-scan driver, the data driver, and the emission driver, wherein the driving circuit unit comprises:

a first driver configured to be driven during a display scan period included in the active period;

a second driver configured to be driven during at least one self-scan period included in the blank period;

a first switch connected between a driving power line to which driving power is supplied and the first driver, configured to be turned on in the active period and configured to be turned off in the blank period in response to control of a controller included in the second driver; and a first storage unit configured to receive and store driving data from the first driver before the first switch is turned off.

17. The display device according to claim 16, further comprising:

a second switch connected between a clock supply line to which a clock signal is supplied and the first driver, configured to be turned on in the active period, and configured to be turned off in the blank period in response to the control of the controller.

18. The display device according to claim 16, further comprising:

a third switch connected between a control signal supply line to which a control signal is supplied and the first driver, configured to be turned on in the active period, and configured to be turned off in the blank period in response to the control of the controller.

19. The display device according to claim 16, wherein the first driver includes a second storage unit configured to be store the driving data, after the first switch is set to a turn-on state and before a data enable signal of a pulse form is supplied, driving data of the first storage unit is supplied to the second storage unit, and after the data enable signal of the pulse form is supplied and while the first switch is set to the turn-on state, driving data of the second storage unit is supplied to the first storage unit.

20. The display device according to claim 19, further comprising:

a fourth switch connected between the driving power line and the first storage unit, configured to be turned on in the active period, and configured to be turned off in the blank period in response to the control of the controller.

21. The display device according to claim 16, wherein the first storage unit is included in the second driver.

22. The display device according to claim 16, further comprising:

a fifth switch connected between the driving power line and each of the display scan driver and data driver, configured to be turned on in the active period, and configured to be turned off in the blank period in response to the control of the controller.

23. A method of driving a display device, the method comprising:

generating output data and a display driving control signal using a first driver during an active period of one frame;

generating a self-driving control signal using a second driver during a blank period of the one frame;

storing driving data for driving the first driver in a first storage unit disposed outside the first driver after the active period;

cutting off driving power supplied to the first driver during the blank period; and transferring the stored driving data from the first storage unit to a second storage unit in the first driver after the blank period.

* * * * *